(12) United States Patent
Osano et al.

(10) Patent No.: US 8,631,152 B2
(45) Date of Patent: Jan. 14, 2014

(54) SYSTEM AND METHOD FOR DATA PACKET TRANSMISSION AND RECEPTION

(75) Inventors: Hidekazu Osano, Kawasaki (JP); Hiroshi Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 935 days.

(21) Appl. No.: 12/385,885

(22) Filed: Apr. 22, 2009

(65) Prior Publication Data

US 2009/0207850 A1 Aug. 20, 2009

Related U.S. Application Data

(63) Continuation of application No. PCT/JP2006/321114, filed on Oct. 24, 2006.

(51) Int. Cl.
*G06F 15/16* (2006.01)

(52) U.S. Cl.
USPC ............ 709/238; 709/232; 709/233; 709/234

(58) Field of Classification Search
USPC .................................. 709/238, 232–234, 382
See application file for complete search history.

(56) References Cited

U.S. PATENT DOCUMENTS

| | | | |
|---|---|---|---|
| 6,337,865 B1 * | 1/2002 | Seto et al. ...................... 370/450 |
| 7,165,094 B2 | 1/2007 | Weber et al. | |
| 2005/0228900 A1 | 10/2005 | Stuart et al. | |
| 2006/0153078 A1 | 7/2006 | Yasui | |

FOREIGN PATENT DOCUMENTS

| | | |
|---|---|---|
| JP | 3-48558 | 3/1991 |
| JP | 9-135270 | 5/1997 |
| JP | 11-110315 | 4/1999 |
| JP | 2001-94613 | 4/2001 |
| JP | 2002-324043 | 11/2002 |
| JP | 2004-102378 | 4/2004 |
| JP | 2004-530197 | 9/2004 |
| JP | 2006-054750 | 2/2006 |
| JP | 2006-189937 | 7/2006 |
| WO | 02/073407 A1 | 9/2002 |

OTHER PUBLICATIONS

Japanese Office Action mailed Sep. 20, 2011 in corresponding Japanese Patent Application 2008-540825.
European Office Action dated Nov. 29, 2010 in corresponding European Patent Application 06 822 094.6.
International Search Report for PCT/JP2006/321114, mailed Dec. 19, 2006.

* cited by examiner

*Primary Examiner* — Andrew Georgandellis
(74) *Attorney, Agent, or Firm* — Staas & Halsey LLP

(57) ABSTRACT

A system transmits a data packet from a transmitting apparatus to a receiving apparatus. The receiving apparatus includes a receive buffer, and a size specifying information transmitting unit that transmits size specifying information to the transmitting apparatus. The transmitting apparatus includes a transmit buffer, a credit storage unit that stores, as a credit, a value corresponding to a total size of all data packets stored in the receive buffer, a credit adding unit that adds a credit to the stored credit on transmitting a data packet, a credit subtracting unit that specifies a size of a read-out data packet on receiving the size specifying information, subtracts a credit corresponding to the specified size from a stored credit, and a transmission controlling unit that controls data packet transmission based on a credit stored in the credit storage unit.

12 Claims, 22 Drawing Sheets

SYSTEM AND METHOD FOR DATA PACKET TRANSMISSION AND RECEPTION

CROSS-REFERENCE TO RELATED APPLICATION

This application is a continuation of PCT international application Ser. No. PCT/JP2006/321114 filed on Oct. 24, 2006 which designates the United States, the entire contents of which are incorporated herein by reference.

FIELD

The embodiments discussed herein are directed to a technology for transmitting and receiving a data packet.

BACKGROUND

Conventionally, in systems transmitting a data packet from a transmit buffer at a transmitting end to a receive buffer at a receiving end, the receiving end informs the transmitting end of the read state of data packets at the receive buffer, so as not to discard data packets due to overflow at the receive buffer. In this way, the transmitting end controls transmission of data packets in general.

For example, Japanese Laid-open Patent Publication No. 09-135270 (pages 2 to 4, FIGS. 1 to 3) discloses a technology involved in determining, based on the maximum length size (maximum size) of a data packet, the fixed number of queues (number of packets) in advance that can be stored in the receive buffer, and controlling transmission of data packets using the fixed number of queues determined. Referring to FIG. 22, the following describes this conventional technique in detail. FIG. 22 is a drawing for explaining an overview and features of a data packet transmission control system according to the conventional technique. As depicted in FIG. 22, an example is explained in which the size of the receive buffer at a receiving end is 16 bytes, the maximum length size of a data packet to be transmitted from the transmitting end is 4 bytes, and the fixed number of queues (number of packets) that can be stored in the receive buffer is determined as four in advance.

As depicted in FIG. 22, the transmitting end includes a credit control counter. Every time a data packet is read out from the transmit buffer and transmitted to the receiving end, the value in the credit control counter is incremented by one regardless of the size (data size) of a data packet to be transmitted (see (1) in FIG. 22). On the other hand, when receiving the data packet from the transmitting end, the receiving end writes the received data packet to the leading portion of the receive buffer (see (2) in FIG. 22). Every time reading out a data packet from the receive buffer, the receiving end transmits one credit back to the transmitting end, regardless of the size of the read data packet (see (3) in FIG. 22). Every time receiving such credit from the receiving end, the transmitting end subtracts the value of the credit from the value in the credit control counter (see (4) in FIG. 22).

In this way, the transmitting end increments and decrements the value in the credit control counter. As described, in this credit control counter, four is set and fixed in advance as the number of queues (the number of packets) that can be stored in the receive buffer. Therefore, at timing for reading out a data packet from the transmit buffer and transmitting the data packet to the receiving end, the transmitting end determines whether the current value in the credit control counter has reached the fixed value (four). If the current value in the credit control counter has not reached the fixed value (four), the transmitting end reads out a data packet from the transmit buffer, and transmits the data packet to the receiving end. On the other hand, if the current value in the credit control counter has reached the fixed value (four), the transmitting end determines that the receive buffer may be filled with data packets, so as to stop transmitting the data packet (see (5) in FIG. 22). Through such a series of processes, discarding data packets due to the overflow at the receive buffer is prevented in Japanese Laid-open Patent Publication No. 09-135270.

Other than the above conventional technique, a known technology uses a buffer as a ring buffer, by controlling credits so as to issue an additional credit depending on a free space in a receive buffer (see, for example, Japanese Laid-open Patent Publication No. 2001-94613 (pages 3 to 5, FIG. 1)). Further, a known technology enables easy management of transmitted data by using a management table for the use state of a transmit buffer in buffer control (see, for example, Japanese Laid-open Patent Publication No. 11-110315 (pages 6 to 10, FIGS. 1 to 2)).

The above conventional techniques, however, tend to create an unused area in the receive buffer as described below, posing a problem of not efficiently using resources of the receive buffer.

Specifically, in the above conventional techniques, the fixed number of queues that can be stored in the receive buffer is determined in advance based on the maximum length size of a data packet (four in the above example). Thus, even when the receive buffer stores therein data packets of small sizes not reaching the maximum length size of a data packet, for example, even when the receive buffer stores therein four packets of sizes: "4 bytes, 2 bytes, 2 bytes, and 2 bytes" as illustrated in FIG. 22, the value in the credit control counter at the transmitting end reaches the fixed value (four). As a result, the transmission of a data packet is stopped. In this case, a large unused area is created in the receive buffer (an unused area of 6 bytes is created in the above example), causing a problem of not efficiently using resources of the receive buffer.

The above problems are not limited to data packet transmission between communication apparatuses via a network, and also occur similarly in any systems that transmit a data packet from a transmit buffer at a transmitting end to a receive buffer at a receiving end, for example, in data packet transmission between circuits inside a computer system.

SUMMARY

A system for transmitting and receiving a data packet according to one aspect of the present invention includes a receiving apparatus that is adapted to receive a transmitted data packet. The receiving apparatus includes a receive buffer that stores a data packet therein, a size specifying information transmitting unit that transmits, when a data packet stored in the receive buffer is read, size specifying information to be used in the transmitting apparatus to specify a size of a read data packet to the transmitting apparatus. The system further includes a transmitting apparatus that is adapted to transmit a data packet to the receiving apparatus. The transmitting apparatus includes a transmit buffer that stores a data packet therein, a credit storage unit that stores therein, as a credit, a value corresponding to a total size of all data packets currently stored in a capacity of the receive buffer, a credit adding unit that adds, when the data packet is transmitted from the transmit buffer to the receiving apparatus, a credit of a value corresponding to a size of the transmitted data packet to the credit stored in the credit storage unit, and stores a resulting credit in the credit storage unit, a credit subtracting unit that specifies, when the size specifying information is received from the receiving apparatus, a size of a data packet read out from the receive buffer, using the size specifying information, and that subtracts a credit of a value corresponding to the size thus specified, from a credit stored in the credit storage unit, and stores a resulting credit in the credit storage unit, and a transmission controlling unit that controls transmission of the data packet by permission and suspension of the transmission of the data packet based on a value of a credit stored in the credit storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a data packet transmission and reception system, a data packet transmission and reception method, and a data packet transmission and reception program according to the present invention are described in detail with reference to the accompanying drawings. In a first embodiment below, an overview and features of a data packet transmission and reception system according to the first embodiment, a configuration of the data packet transmission and reception system, its process flow, and advantages are described in this order.

[a] First Embodiment

Figure 1:
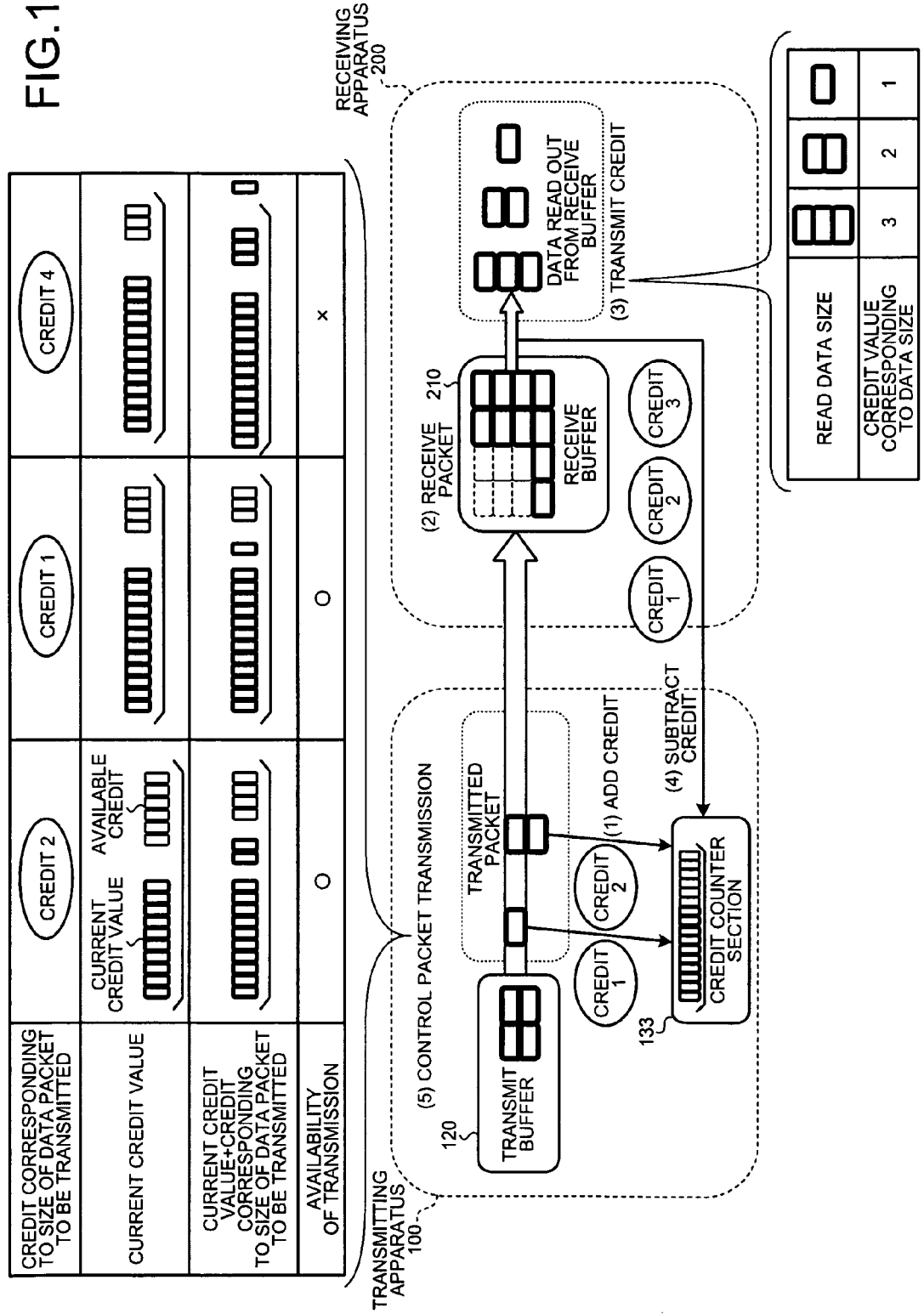
FIG. 1 is a drawing for explaining an overview and features of a data packet transmission and reception system according to a first embodiment.

Referring first to FIG. 1, an overview and features of a data packet transmission and reception system according to the first embodiment are described. FIG. 1 is a drawing for explaining an overview and features of the data packet transmission and reception system according to the first embodiment.

As depicted in FIG. 1, the data packet transmission and reception system according to the first embodiment is a data packet transmission and reception system that transmits a data packet from a transmitting apparatus 100 including a transmit buffer 120 to a receiving apparatus 200 including a receive buffer 210. The data packet transmission and reception system configured as such has a main feature of being capable of efficiently using resources of the receive buffer 210, as described below.

As illustrated in FIG. 1, the transmitting apparatus 100 includes a credit counter section 133 that stores therein, as a credit, a value corresponding to a total size of all data packets currently stored in the capacity of the receive buffer 210. The transmitting apparatus 100 sets a credit value (e.g., "16") corresponding to the capacity of the receive buffer 210 of the receiving apparatus 200, as an upper limit of a credit value in the credit counter section 133. Thus, the transmitting apparatus 100 can know a free space in the receive buffer 210, based on a credit value left in the credit counter section 133.

When transmitting a data packet from the transmit buffer 120 to the receive buffer 210 of the receiving apparatus 200, the transmitting apparatus 100 adds a credit corresponding to the size of the transmitted data packet to the credit stored in the credit counter section 133, and stores the resulting credit in the credit counter section 133 (see (1) in FIG. 1). As depicted in FIG. 1 for example, the transmitting apparatus 100 adds a credit "2" to the credit value in the credit counter section 133 when transmitting a data packet of 2 bytes, or adds a credit "1" to the credit value in the credit counter section 133 when transmitting a data packet of 1 byte.

On the other hand, the receiving apparatus 200 receives, at the receive buffer 210, the data packets transmitted from the transmitting apparatus 100 (see (2) in FIG. 1). The receiving apparatus 200 then reads out the received data packets in the order in which the data packets have been stored in the receive buffer 210, with the oldest data packet first, and transmits a credit corresponding to the size of the data read out from the receive buffer 210 to the transmitting apparatus 100 (see (3) in FIG. 1). For example, the receiving apparatus 200 transmits a credit "1" to the transmitting apparatus 100 when reading out a data packet of 1 byte from the receive buffer 210, transmits a credit "2" to the transmitting apparatus 100 when reading a data packet of 2 bytes, or transmits a credit "3" to the transmitting apparatus 100 when reading a data packet of 3 bytes.

When receiving such credit transmitted from the receiving apparatus 200, the transmitting apparatus 100 subtracts the received credit from the credit value stored in the credit counter section 133, and stores the resulting credit in the credit counter section 133 (see (4) in FIG. 1). For example, the transmitting apparatus 100 subtracts a credit "1" from the credit value in the credit counter section 133 when receiving a credit "1", subtracts a credit "2" from the credit value in the credit counter section 133 when receiving a credit "2", or subtracts a credit "3" from the credit value in the credit counter section 133 when receiving a credit "3".

The transmitting apparatus 100 controls the transmission of data packets by permission and suspension based on the credit value stored in the credit counter section 133. Specifically, the transmitting apparatus 100 determines whether a sum value of credit values, obtained by adding a value of a credit corresponding to the size of a data packet to be transmitted from the transmitting apparatus 100 to the credit value stored in the credit counter section 133, has reached a predetermined value (an upper limit) determined depending on the capacity of the receive buffer 210. If the sum value of the credit values has not reached the upper limit, the transmitting apparatus 100 controls the transmission by permitting the transmission of the data packet. If the sum value of the credit values has reached the upper limit, the transmitting apparatus 100 controls the transmission by stopping the transmission of the data packet.

For example, when the upper limit for the credit counter section 133 is 16, and if the current credit value is "10" and a credit value corresponding to the size of a data packet to be transmitted is "2", the sum value of the credit values is "12" and does not reach the upper limit "16". Thus, the transmitting apparatus 100 permits the transmission. If the current credit value is "12" and a credit value corresponding to the size of a data packet to be transmitted is "1", the sum value of the credits is "13". Therefore, the transmission apparatus 100 permits the transmission. On the other hand, if the current credit value is "13" and a credit value corresponding to the size of a data packet to be transmitted is "4", the sum value of the credits is "17" and reaches the upper limit "16". Thus, the transmitting apparatus 100 stops the transmission (see (5) in FIG. 1).

As such, in the data packet transmission and reception system, the transmitting apparatus 100 grasps how the receive buffer 210 is congested with data packets based on the data size, not on the number of data packets, so as to transmit data packets while dynamically adjusting the number of data packets (the number of queues) to be stored in the receive buffer 210 to make it fall in a range not causing overflow of the data packets. Accordingly, an unused area can be reduced in the receive buffer 210, so that the resources of the receive buffer 210 can be used efficiently.

The transmitting apparatus 100 and the receiving apparatus 200 are: electronic devices, such as portable telephones, personal digital assistants (PDAs), or personal computers, that transmit or receive information as packets via a network or wired communication, or wirelessly (infrared communication, Bluetooth, or the like); or electronic circuits, such as circuits or chips inside the same electronic device, that transmit or receive information as packets via a bus or a wire inside an electronic device.

Figure 2:
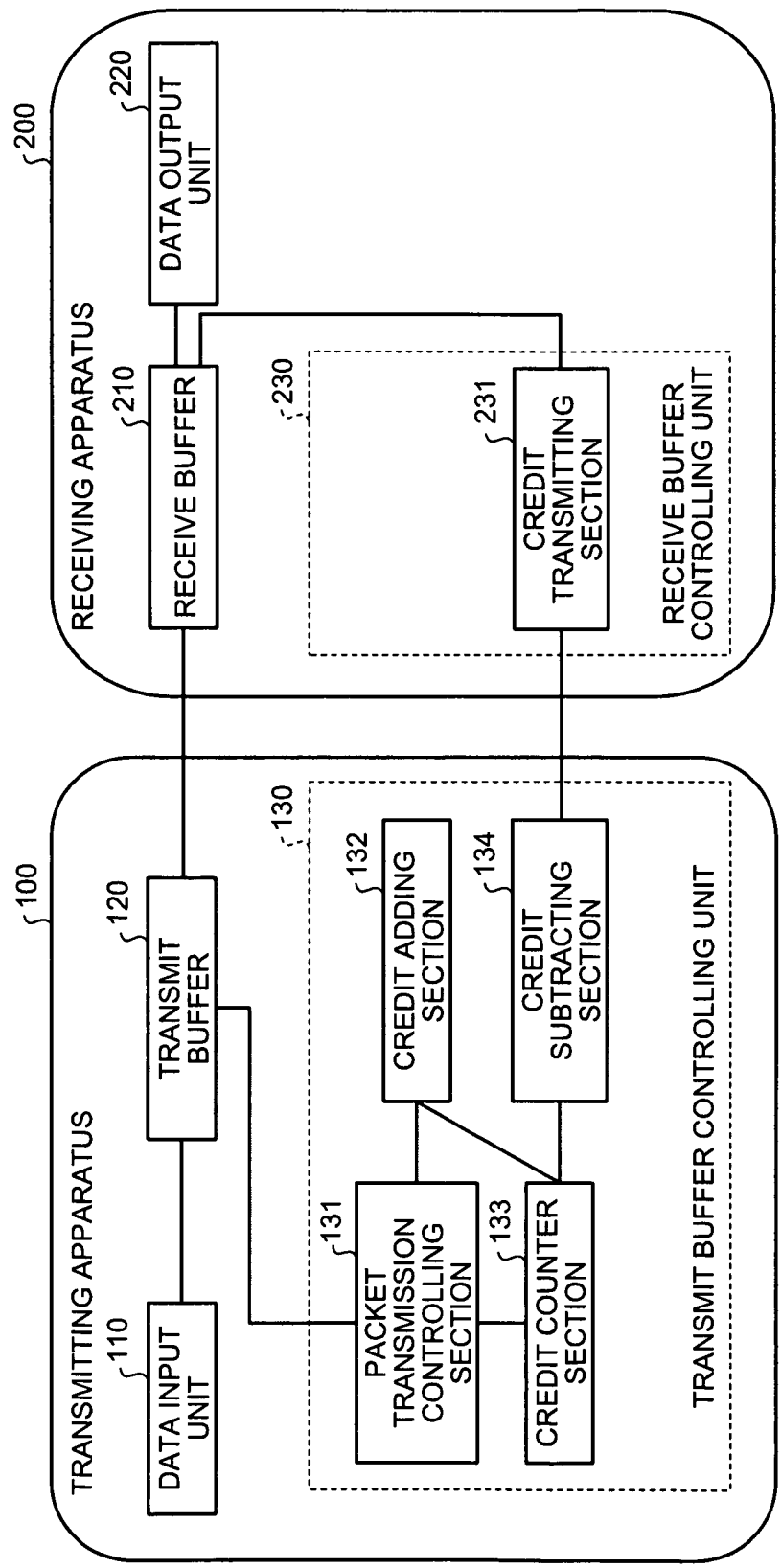
FIG. 2 is a schematic block diagram of a configuration of the data packet transmission and reception system according to the first embodiment.

Referring to FIG. 2, the following describes a configuration of the data packet transmission and reception system according to the first embodiment. FIG. 2 is a schematic block diagram of the data packet transmission and reception system according to the first embodiment. As depicted in FIG. 2, the data packet transmission and reception system includes the transmitting apparatus 100 and the receiving apparatus 200. The transmitting apparatus 100 includes a data input unit 110, the transmit buffer 120, and a transmit buffer controlling unit 130. The receiving apparatus 200 includes the receive buffer 210, a data output unit 220, and a receive buffer controlling unit 230. Further, the transmitting apparatus 100 and the receiving apparatus 200 are connected via a network or wired communication, or wirelessly (infrared communication, Bluetooth, or the like), or via a bus or a wire inside an electronic device.

The data input unit 110 inputs various kinds of information to the transmit buffer 120. Specifically, the data input unit 110 writes to the leading portion of the transmit buffer 120 a data packet to be transmitted from the transmitting apparatus 100 to the receiving apparatus 200.

The transmit buffer 120, constituted by a memory or the like, stores therein a data packet to be transmitted from the transmitting apparatus 100 to the receiving apparatus 200. Specifically, the transmit buffer 120 stores in its leading portion a data packet input from the data input unit 110. In the transmit buffer 120, every time a data packet is read, the read data packet is removed and a new data packet is overwritten.

The transmit buffer controlling unit 130 controls transmission and reception of a data packet, and includes a packet transmission controlling section 131, a credit adding section 132, the credit counter section 133, and a credit subtracting section 134 as elements involved in the present invention, as depicted in FIG. 2. The packet transmission controlling section 131, the credit adding section 132, the credit counter section 133, and the credit subtracting section 134 may also be referred to as a "transmission controlling unit", a "credit adding unit", a "credit storage unit", and a "credit subtracting unit", respectively.

The credit counter section 133 stores therein, as a credit, a value corresponding to a total size of all data packets currently stored in the capacity of the receive buffer 210. Specifically, the credit counter section 133 stores therein, as a credit, a value corresponding to a total size of all data packets currently stored in the capacity of the receive buffer 210 after the credit adding section 132 and the credit subtracting section 134, described later, respectively increment and decrement the stored credit value.

The credit counter section 133 stores therein, as a predetermined value (an upper limit), a credit corresponding to a maximum value of the capacity of the receive buffer 210. For example, if the maximum value of the capacity of the receive buffer 210 is 16 bytes, the credit counter section 133 stores therein a credit "16" corresponding to 16 bytes, as the credit upper limit for the credit counter section 133. If the maximum value of the capacity of the receive buffer 210 is 32 bytes, the credit counter section 133 stores therein a credit "32" corresponding to 32 bytes, as the credit upper limit for the credit counter section 133.

When a data packet is transmitted from the transmit buffer 120 to the receiving apparatus 200, the credit adding section 132 adds a credit of a value corresponding to the size of the transmitted data packet to the credit value stored in the credit counter section 133, and stores the resulting credit in the credit counter section 133.

For example, when a data packet of 2 bytes is transmitted from the transmit buffer 120, the credit adding section 132 adds a credit of a value corresponding to 2 bytes, i.e., a credit "2", to the credit value in the credit counter section 133 and stores the resulting credit in the credit counter section 133. When the transmitting apparatus 100 transmits a data packet of 1 byte from the transmit buffer 120, the credit adding section 132 adds a credit corresponding to 1 byte, i.e., a credit "1", to the credit value in the credit counter section 133 and stores the resulting credit in the credit counter section 133.

When receiving size specifying information described later from the receiving apparatus 200, the credit subtracting section 134 specifies, using the size specifying information, the size of a data packet read out from the receive buffer 210, subtracts a credit of a value corresponding to the specified size from the credit value stored in the credit counter section 133, and stores the resulting credit in the credit counter section 133. Specifically, the credit subtracting section 134 subtracts a credit value received from the receiving apparatus 200 from the credit value stored in the credit counter section 133, and stores the resulting credit in the credit counter section 133.

For example, when receiving a credit "1", the credit subtracting section 134 subtracts the credit "1" from the credit value in the credit counter section 133. When receiving a credit "2", the credit subtracting section 134 subtracts the credit "2" from the credit value in the credit counter section 133. When receiving a credit "3", the credit subtracting section 134 subtracts the credit "3" from the credit value in the credit counter section 133.

The packet transmission controlling section 131 is a controlling section that controls the transmission of data packets by permission or suspension based on the credit value stored in the credit counter section. Specifically, at timing for transmitting a data packet, the packet transmission controlling section 131 determines whether a sum value, obtained by adding a credit value corresponding to the size of a data packet to be transmitted from the transmitting apparatus 100 to the credit value stored in the credit counter section 133, has reached a predetermined value (an upper limit) determined depending on the capacity of the receive buffer 210. If the sum value has not reached the upper limit, the packet transmission controlling section 131 controls the transmission by permitting the transmission of the data packet. If the sum value has reached the upper limit, the packet transmission controlling section 131 controls the transmission by stopping the transmission of the data packet.

For example, when the upper limit set in the credit counter section 133 is "16", and if the current credit value is "10" and a credit value corresponding to the size of a data packet to be transmitted is "2", the sum value of the credit values is "12" and does not reach the upper limit "16". Thus, the packet transmission controlling section 131 permits the transmission. If the current credit value is "12" and a credit value corresponding to the size of a data packet to be transmitted is "1", the sum value of the credits is "13". Therefore, the packet transmission controlling section 131 permits the transmission. On the other hand, if the current credit value is "13" and a credit value corresponding to the size of a data packet to be transmitted is "4", the sum value of the credits is "17" and reaches the upper limit "16". Thus, the packet transmission controlling section 131 stops the transmission.

In the receiving apparatus 200, the receive buffer 210, constituted by a memory or the like, stores therein a data packet transmitted from the transmitting apparatus 100. Specifically, the receive buffer 210 stores in its leading portion a data packet transmitted from the transmitting apparatus 100. In the receive buffer 210, when a data packet is read by the data output unit 220 described later, the read data packet is removed and a new data packet is overwritten.

The data output unit 220 reads out data stored in the receive buffer 210. Specifically, the data output unit 220 reads out data stored in the receive buffer 210, in the order in which pieces of the data have been received, with the oldest piece first.

The receive buffer controlling unit 230 controls transmission and reception of a data packet, and includes a credit transmitting section 231 as an element involved in the present invention, as depicted in FIG. 2. The credit transmitting section 231 may also be referred to as a "size specifying information transmitting unit". When a data packet stored in the receive buffer 210 is read, the credit transmitting section 231 transmits to the transmitting apparatus 100 the size specifying information to be used in the transmitting apparatus 100 to specify the size of the read data packet. Specifically, the credit transmitting section 231 transmits, as the size specifying information, a credit of a value corresponding to the size of the data packet read out from the receive buffer 210 to the transmitting apparatus 100.

For example, when the receiving apparatus 200 reads out a data packet of 1 byte from the receive buffer 210, the credit transmitting section 231 transmits a credit "1" corresponding to 1 byte to the transmitting apparatus 100. When a data packet of 2 bytes is read, a credit "2" is transmitted to the transmitting apparatus 100. When a data packet of 3 bytes is read, a credit "3" is transmitted to the transmitting apparatus 100.

Figure 3:
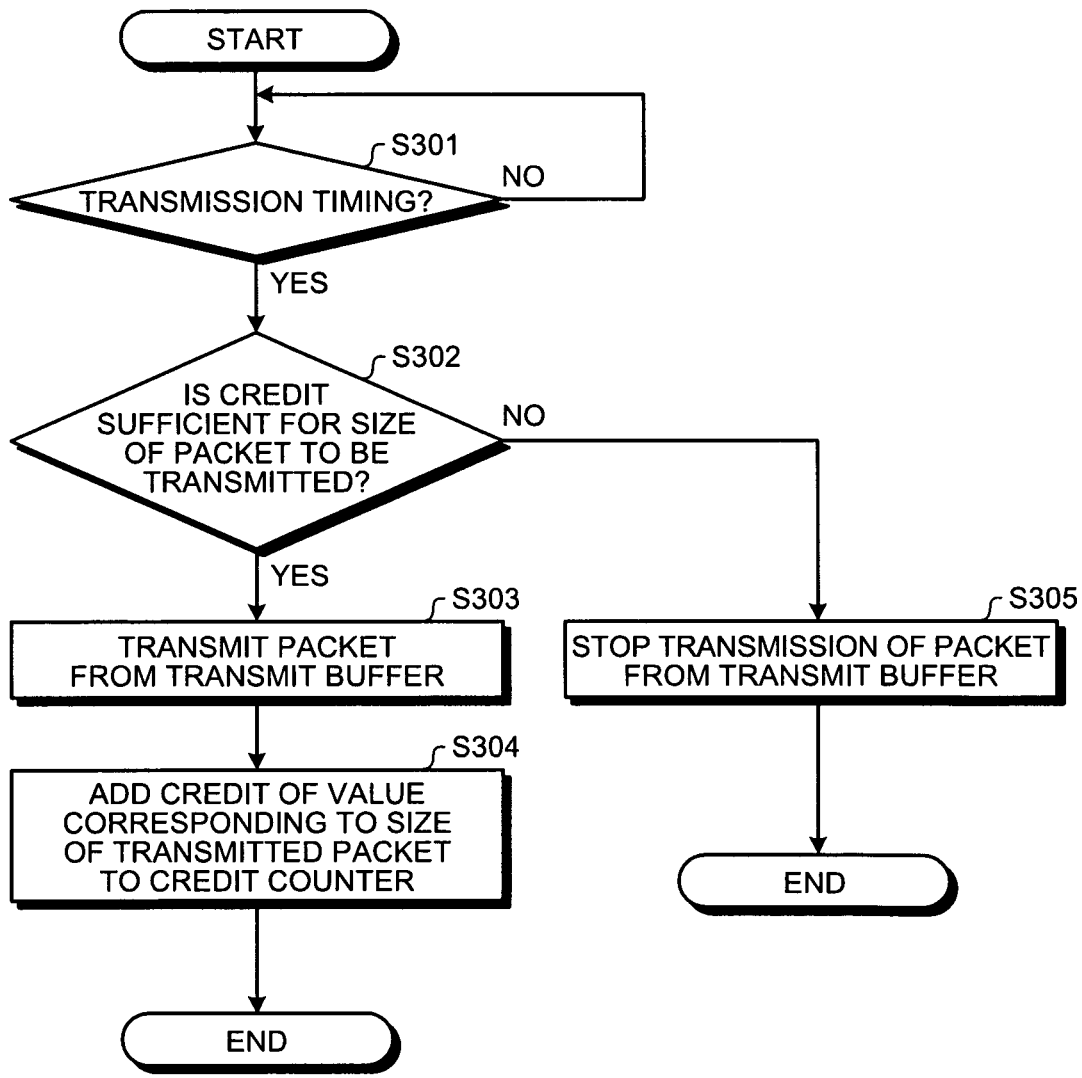
FIG. 3 is a flowchart of processing for transmitting a packet according to the first embodiment.

Referring to FIG. 3, the following describes a procedure for transmitting a packet according to the first embodiment. FIG. 3 is a flowchart of processing for transmitting a packet according to the first embodiment.

As depicted in FIG. 3, at timing for transmitting a data packet (YES at Step S301), the packet transmission controlling section 131 determines whether the credit is sufficient for the size of a data packet to be transmitted (specifically, whether the sum value obtained by adding a credit value corresponding to the size of a data packet to be transmitted to the credit value in the credit counter section 133 has reached an upper limit for the capacity of the receive buffer 210) (Step S302).

If the credit counter section 133 has a sufficient credit for the size of the data packet to be transmitted (if the sum value has not reached the upper limit) (YES at Step S302), the packet transmission controlling section 131 transmits the data packet from the transmit buffer 120 (Step S303). Specifically, the packet transmission controlling section 131 permits transmission of the data packet.

When the transmitting apparatus 100 transmits the data packet from the transmit buffer 120, the credit adding section 132 adds a credit corresponding to the size of the transmitted data packet to the credit stored in the credit counter section 133, and stores the resulting credit in the credit counter section 133 (Step S304).

On the other hand, at Step S302 above, if the credit counter section 133 does not have a sufficient credit for the size of the data packet to be transmitted (if the sum value has reached the upper limit) (NO at Step S302), the packet transmission controlling section 131 stops transmission of the data packet from the transmit buffer 120 (Step S305).

Figure 4:
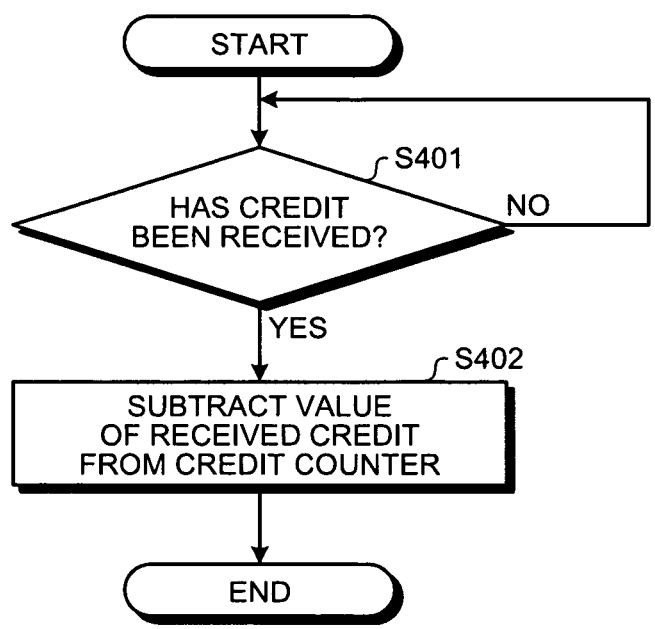
FIG. 4 is a flowchart of processing for receiving a credit according to the first embodiment.

Referring to FIG. 4, the following describes a procedure for receiving a credit according to the first embodiment. FIG. 4 is a flowchart of processing for receiving a credit according to the first embodiment.

As depicted in FIG. 4, when the transmitting apparatus 100 receives a credit from the receiving apparatus 200 (YES at Step S401), the credit subtracting section 134 subtracts the received credit value from the credit value stored in the credit counter section 133, and stores the resulting credit in the credit counter section 133 (Step S402). For example, the transmitting apparatus 100 subtracts a credit "1" from the credit value in the credit counter section 133 when receiving a credit "1", subtracts a credit "2" from the credit value in the credit counter section 133 when receiving a credit "2", or subtracts a credit "3" from the credit value in the credit counter section 133 when receiving a credit "3".

Figure 5:
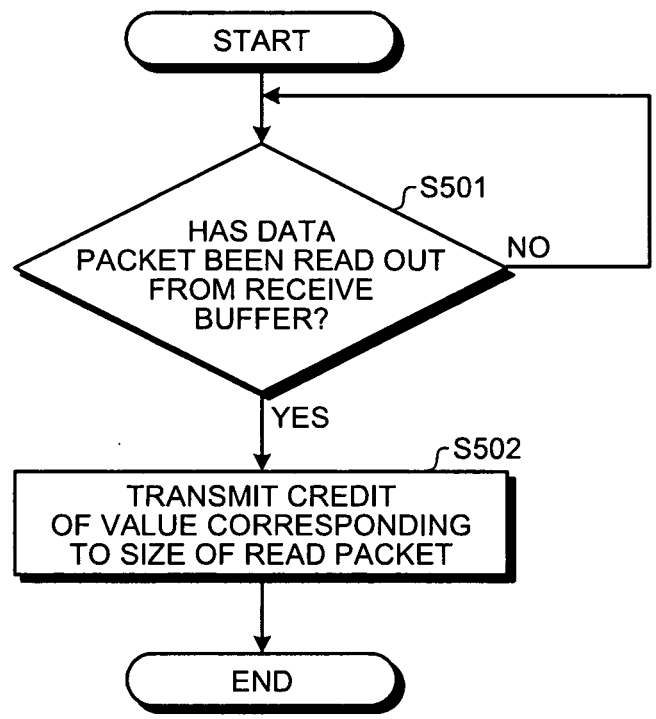
FIG. 5 is a flowchart of processing for transmitting a credit according to the first embodiment.

Referring to FIG. 5, the following describes a procedure for transmitting a credit according to the first embodiment. FIG. 5 is a flowchart of processing for transmitting a credit according to the first embodiment.

As depicted in FIG. 5, when the data output unit 220 reads out data stored in the receive buffer 210 of the receiving apparatus 200 (YES at Step S501), a credit corresponding to the size of the read data is transmitted to the credit counter section 133 (Step S502). For example, when the receiving apparatus 200 reads out a data packet of 1 byte from the receive buffer 210, the credit transmitting section 231 transmits a credit "1" corresponding to 1 byte to the transmitting apparatus 100. When a data packet of 2 bytes is read, a credit "2" is transmitted to the transmitting apparatus 100. When a data packet of 3 bytes is read, a credit "3" is transmitted to the transmitting apparatus 100.

As described, according to the first embodiment, when a data packet stored in the receive buffer 210 is read, the receiving apparatus 200 transmits to the transmitting apparatus 100 the size specifying information to be used in the transmitting apparatus 100 to specify the size of the read data packet. The transmitting apparatus 100 stores therein, as a credit, a value corresponding to a total size of all data packets currently stored in the capacity of the receive buffer 210. When a data packet is transmitted from the transmit buffer 120 to the receiving apparatus 200, the transmitting apparatus 100 adds a credit of a value corresponding to the size of the transmitted data packet to the credit stored in the credit counter section 133, and stores the resulting credit in the credit counter section 133. When receiving the size specifying information from the receiving apparatus 200, the transmitting apparatus 100 specifies, using the size specifying information, the size of the data packet read out from the receive buffer 210, subtracts a credit of a value corresponding to the specified size from the credit stored in the credit counter section 133, and stores the resulting credit in the credit counter section 133. Based on the credit value stored in the credit counter section 133, the transmitting apparatus 100 controls the transmission by permission or suspension of the transmission of the data packet. Thus, the transmitting apparatus 100 grasps how the receive buffer 210 is congested with data packets based on the data size, not on the number of data packets, so as to transmit data packets while dynamically adjusting the number of data packets (the number of queues) to be stored in the receive buffer 210 to make it fall in a range not causing overflow of the data packets. Accordingly, an unused area can be reduced in the receive buffer 210, so that the resources of the receive buffer 210 can be used efficiently.

According to the first embodiment, the credit transmitting section 231 transmits, as size specifying information, a credit of a value corresponding to the size of a data packet read out from the receive buffer 210 to the transmitting apparatus 100. The credit adding section 132 adds a credit of a value corresponding to the size of the data packet transmitted to the receiving apparatus 200 to the credit stored in the credit counter section 133, and stores the resulting credit in the credit counter section 133. The credit subtracting section 134 subtracts a credit of a value received from the receiving apparatus 200 from the credit stored in the credit counter section 133, and stores the resulting credit in the credit counter section 133. Accordingly, the transmitting apparatus 100 can grasp how the receive buffer 210 is congested with data packets, only by subtracting the credit received from the receiving apparatus 200. This enables to simplify the process for incrementing and decrementing the credit in the transmitting apparatus 100.

According to the first embodiment, the packet transmission controlling section 131 determines whether a sum value, obtained by adding a value of a credit corresponding to the size of a data packet to be transmitted from the transmitting apparatus 100 to the credit value stored in the credit counter section 133, has reached a predetermined value defined depending on the capacity of the receive buffer 210. If the sum value has not reached the predetermined value (the upper limit), the packet transmission controlling section 131 controls the transmission by permitting the transmission of the data packet. If the sum value has reached the upper limit, the packet transmission controlling section 131 controls the transmission by stopping the transmission of the data packet. Accordingly, estimation can be made as to how the receive buffer 210 is congested with data packets after the data packet to be transmitted is transmitted. This reliably prevents the overflow at the receive buffer 210.

[b] Second Embodiment

The first embodiment describes transmission of a credit corresponding to the size of data read out from the receive buffer. The present invention is not limited to this, and a credit of the same amount may be transmitted each time regardless of the size of the read data. A second embodiment describes that a credit of the same amount is transmitted each time regardless of the size of a data packet read out from the receive buffer.

Figure 6:
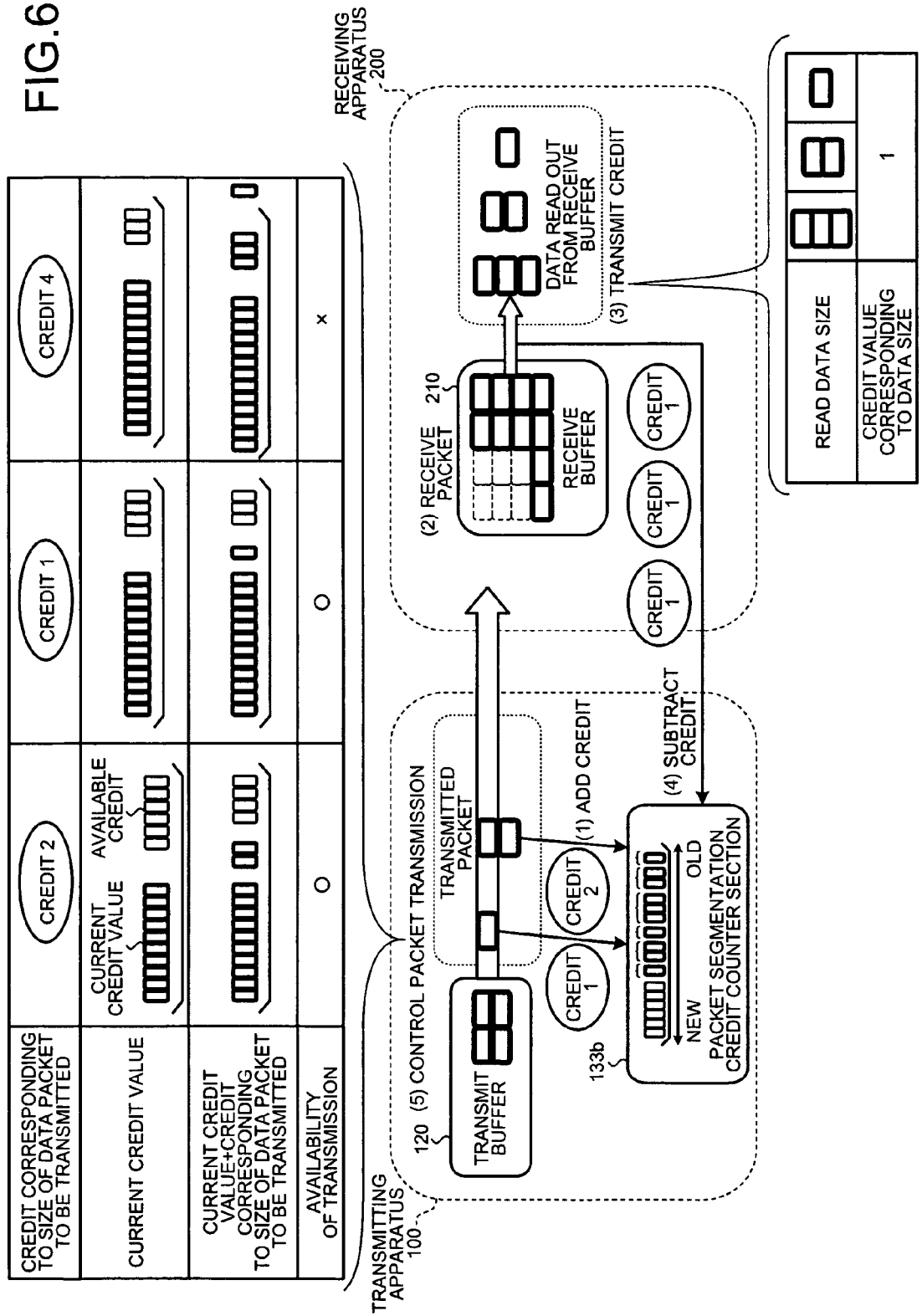
FIG. 6 is a drawing for explaining an overview and features of a data packet transmission and reception system according to a second embodiment.

Referring first to FIG. 6, an overview and features of a data packet transmission and reception system according to the second embodiment are described. FIG. 6 is a drawing for explaining an overview and features of the data packet transmission and reception system according to the second embodiment. Elements similar to those of the data packet transmission and reception system according to the first embodiment are described briefly.

As illustrated in FIG. 6, the transmitting apparatus 100 includes a packet segmentation credit counter section 133$b$ that stores therein, as a credit, a value corresponding to a total size of all data packets currently stored in the capacity of the receive buffer 210, such that credit elements are arranged in the order in which the data packets have been transmitted.

When transmitting a data packet from the transmit buffer 120 to the receive buffer 210 of the receiving apparatus 200, the transmitting apparatus 100 adds a credit corresponding to the size of the transmitted data packet to the credit stored in the packet segmentation credit counter section 133$b$ and stores the resulting credit in the credit counter section 133$b$, in the order in which the data packets have been transmitted (see (1) in FIG. 6).

As depicted in FIG. 6 for example, when transmitting a data packet of 2 bytes, the transmitting apparatus 100 adds (makes increment of) a credit "121" as a most recently transmitted data packet to the credit value in the packet segmentation credit counter section 133$b$, so as to make the credit value (total) in the packet segmentation credit counter section 133$b$ from "7" to "9". When transmitting a data packet of 1 byte subsequently, the transmitting apparatus 100 adds (makes increment of) a credit "1" as a most recently transmitted data packet (e.g., after a packet 5) to the credit value in the packet segmentation credit counter section 133b, so as to make the credit value (total) in the packet segmentation credit counter section 133b from "9" to "10" (see FIG. 8).

On the other hand, the receiving apparatus 200 receives, at the receive buffer 210, data packets transmitted from the transmitting apparatus 100 (see (2) in FIG. 6). The receiving apparatus 200 then reads out the received data packets in the order in which the data packets have been stored in the receive buffer 210, with the oldest data packet first. Further, the receiving apparatus 200 transmits a credit "1" to the transmitting apparatus 100 regardless of the size of the read data (see (3) in FIG. 6). For example, the receiving apparatus 200 transmits a credit "1" to the transmitting apparatus 100 when reading out a data packet of 1 byte from the receive buffer 210, transmits a credit "1" to the transmitting apparatus 100 when reading a data packet of 2 bytes, or transmits a credit "1" to the transmitting apparatus 100 when reading a data packet of 3 bytes.

When receiving a credit transmitted from the receiving apparatus 200, the transmitting apparatus 100 subtracts a credit value of the oldest data packet having been transmitted, from the credit elements that have been stored in the packet segmentation credit counter section 133b in the order in which data packets have been transmitted, and stores the resulting credit in the packet segmentation credit counter section 133b (see (4) in FIG. 6).

Figure 9:
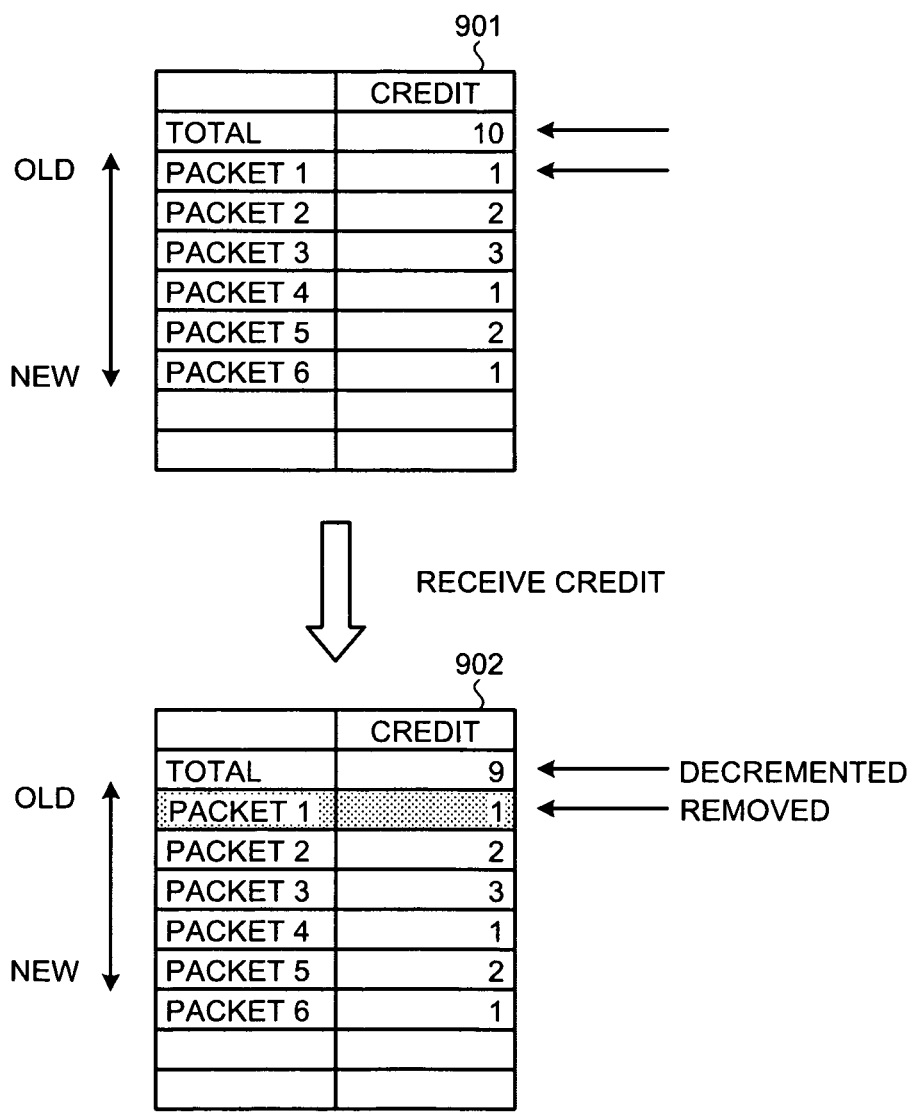
FIG. 9 is a conceptual diagram of processing for subtracting a credit according to the second embodiment.

For example, when receiving a credit "1", the transmitting apparatus 100 subtracts (removes), from the credit value in the packet segmentation credit counter section 133b, the oldest credit value among the credit elements stored in the packet segmentation credit counter section 133b, i.e., a credit "1", so as to make the credit value (total) in the packet segmentation credit counter section 133b from "10" to "9" (see FIG. 9). When receiving a credit "1" subsequently, the transmitting apparatus 100 subtracts, from the credit value in the packet segmentation credit counter section 133b, the oldest credit value among the credit elements stored in the packet segmentation credit counter section 133b, i.e., a credit "2", so as to make the credit value in the packet segmentation credit counter section 133b from "9" to "7".

The transmitting apparatus 100 controls the transmission by permission or suspension of the transmission of a data packet based on the credit value stored in the packet segmentation credit counter section 133b (see (5) in FIG. 6), as in the transmitting apparatus 100 according to the first embodiment.

As such, in the data packet transmission and reception system according to the second embodiment, the transmitting apparatus 100 can grasp how the receive buffer 210 is congested with data packets, only by transmitting a credit of the same amount from the receiving apparatus 200 to the transmitting apparatus 100 each time regardless of the size of a data packet read out from the receive buffer 210. This enables to simplify the process for giving a response from the receiving apparatus 200 to the transmitting apparatus 100.

Figure 7:
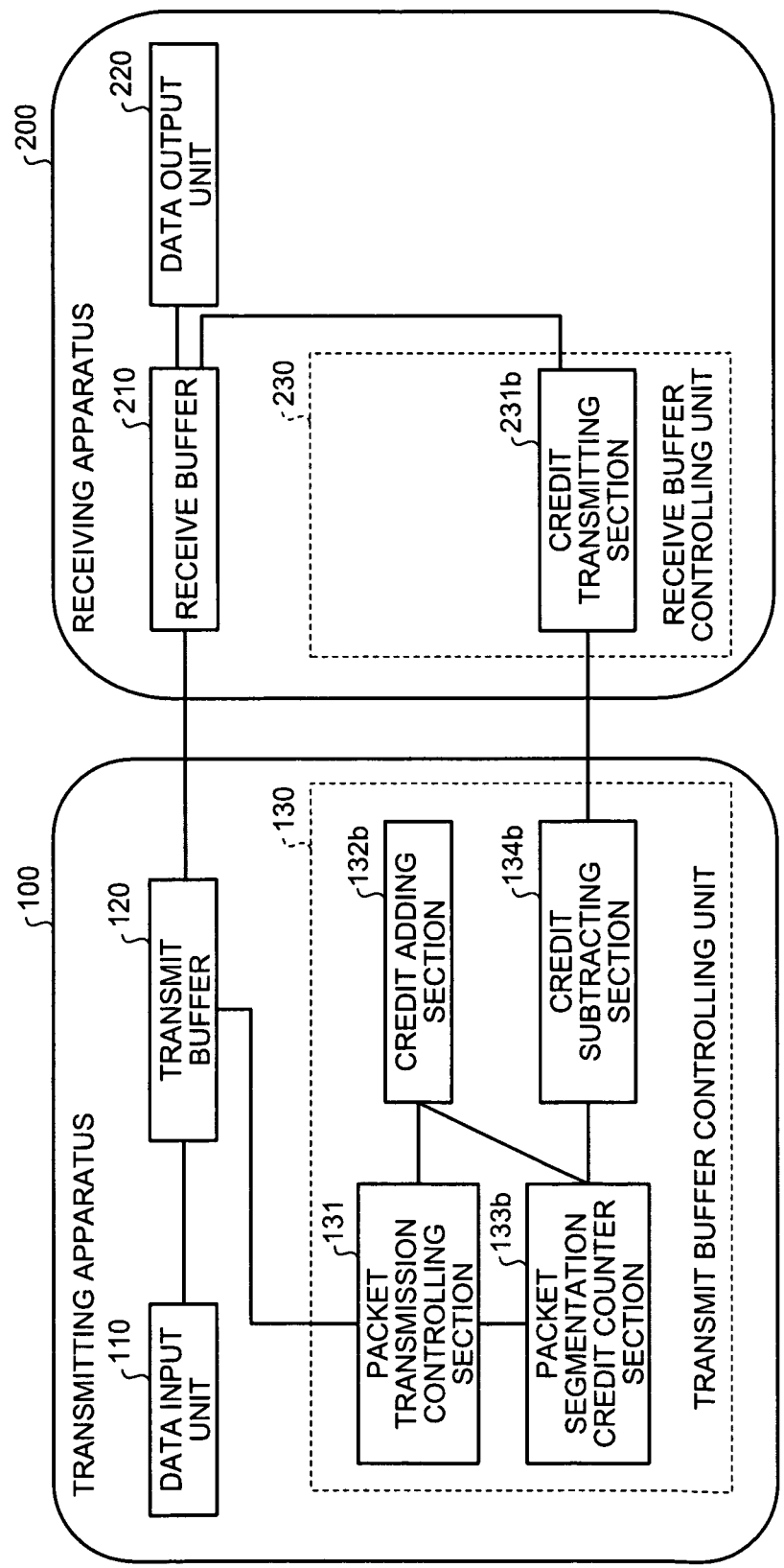
FIG. 7 is a schematic block diagram of the data packet transmission and reception system according to the second embodiment.

Referring to FIG. 7, the following describes a configuration of the data packet transmission and reception system according to the second embodiment. FIG. 7 is a schematic block diagram of the data packet transmission and reception system according to the second embodiment. As depicted in FIG. 7, the data packet transmission and reception system includes the transmitting apparatus 100 and the receiving apparatus 200. The transmitting apparatus 100 includes the data input unit 110, the transmit buffer 120, and the transmit buffer controlling unit 130. The receiving apparatus 200 includes the receive buffer 210, the data output unit 220, and the receive buffer controlling unit 230.

Elements performing the same operations as in the first embodiment are given the same numerals and descriptions thereof are omitted here. The following only describes the packet segmentation credit counter section 133b, a credit adding section 132b, a credit subtracting section 134b, and a credit transmitting section 231b.

The packet segmentation credit counter section 133b stores therein, as a credit, a value corresponding to a total size of all data packets currently stored in the capacity of the receive buffer 210. Specifically, the packet segmentation credit counter section 133b stores credit elements therein in the order in which the respective packets have been transmitted from the transmitting apparatus 100, as described later.

When a data packet is transmitted from the transmit buffer 120 to the receiving apparatus 200, the credit adding section 132b adds a credit of a value corresponding to the size of the data packet transmitted to the receiving apparatus 200 to the credit value stored in the packet segmentation credit counter section 133b and stores the resulting credit in the packet segmentation credit counter section 133b, in the order in which data packets have been transmitted.

Figure 8:
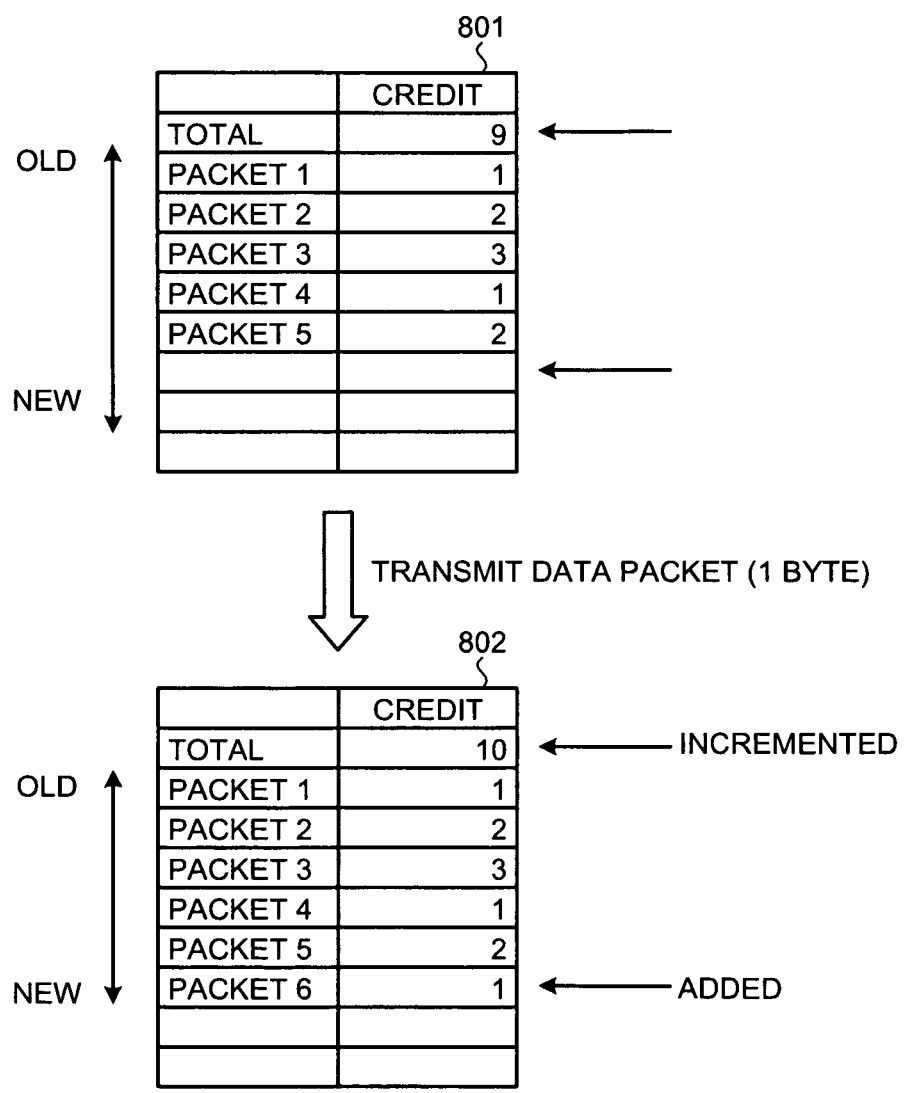
FIG. 8 is a conceptual diagram of processing for adding a credit according to the second embodiment.

Specifically, as depicted in FIG. 8, when transmitting a data packet of 1 byte, the transmitting apparatus 100 places a credit "1" to the end (e.g., after a packet 5) as a credit corresponding to the most recently transmitted data packet, so as to add (make increment of) the credit "1" to the credit value in the packet segmentation credit counter section 133b. This makes the credit value (total) in the packet segmentation credit counter section 133b from "9" to "10". FIG. 8 is a conceptual diagram of processing for adding a credit according to the second embodiment.

When receiving size specifying information described later from the receiving apparatus 200, the credit subtracting section 134b subtracts the oldest credit having been transmitted, from the credit elements that have been stored in the packet segmentation credit counter section 133b in the order in which the respective data packets have been transmitted.

As depicted in FIG. 9 for example, when receiving a credit "1", the transmitting apparatus 100 subtracts (removes) the oldest credit value among the credit elements stored in the packet segmentation credit counter section 133b, i.e., a credit "1", from the credit value in the packet segmentation credit counter section 133b. This makes the credit value (total) in the packet segmentation credit counter section 133b from "10" to "9". FIG. 9 is a conceptual diagram of processing for subtracting a credit according to the second embodiment.

The credit transmitting section 231b transmits the size specifying information to the transmitting apparatus 100 regardless of the size of a data packet read out from the receive buffer 210. Specifically, the credit transmitting section 231b transmits, as the size specifying information, a credit "1" to the transmitting apparatus 100 regardless of the size of a data packet read out from the receive buffer 210.

Figure 10:
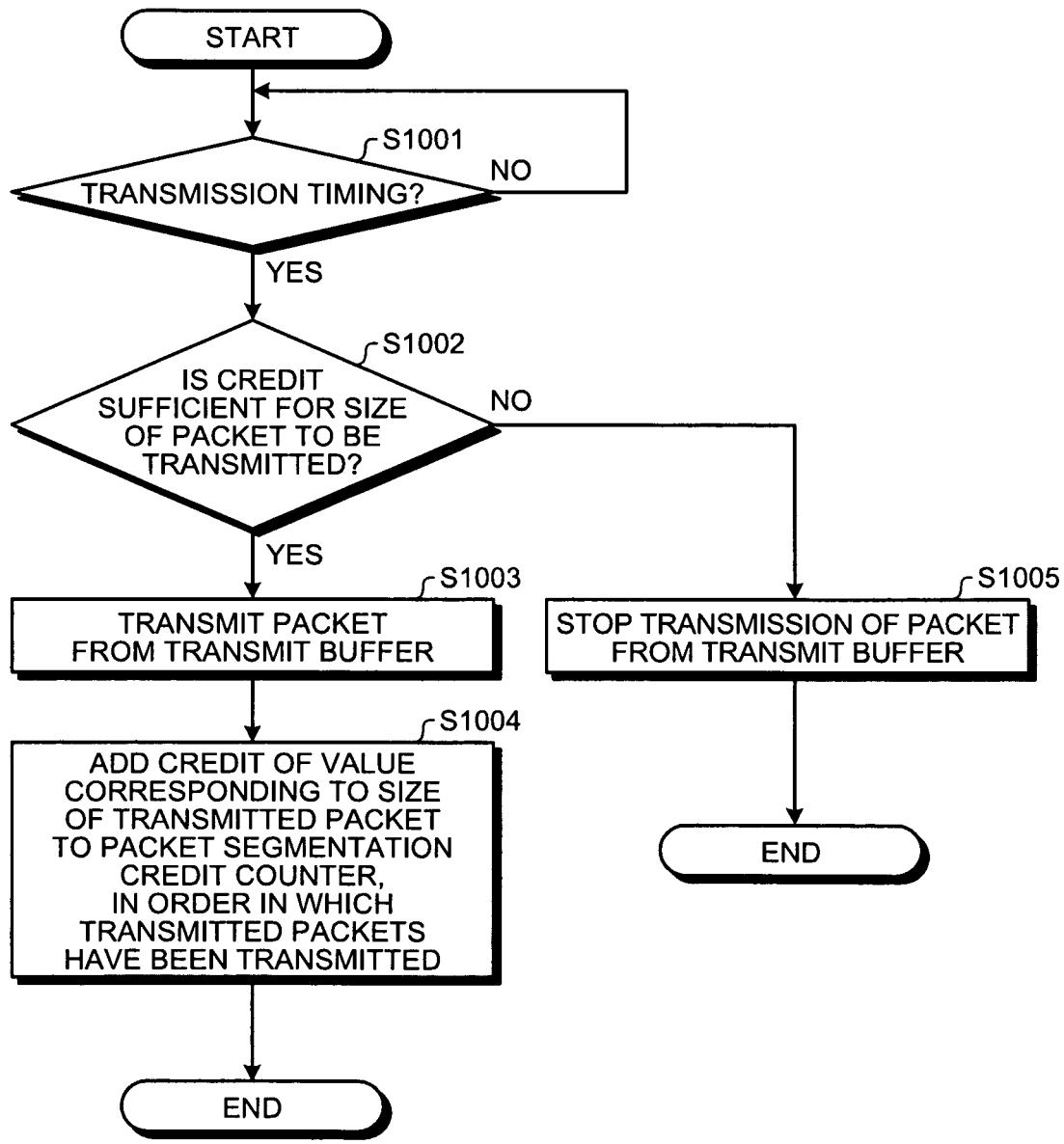
FIG. 10 is a flowchart of processing for transmitting a packet according to the second embodiment.

Referring to FIG. 10, the following describes a procedure for transmitting a packet according to the second embodiment. FIG. 10 is a flowchart of processing for transmitting a packet according to the second embodiment. Elements similar to those of the data packet transmission and reception system according to the first embodiment are described briefly.

As depicted in FIG. 10, at transmission timing, when a data packet is transmitted from the transmit buffer 120 (Step S1001 to Step S1003), the credit adding section 132b adds a credit corresponding to the size of the transmitted data packet to the credit stored in the packet segmentation credit counter section 133*b* and stores the resulting credit in the packet segmentation credit counter section 133*b*, in the order in which packets have been transmitted (Step S1004).

As depicted in FIG. 8 for example, when transmitting a data packet of 1 byte, the transmitting apparatus 100 adds (makes increment of) a credit "1" to the credit value in the packet segmentation credit counter section 133*b*, so as to make the credit value (total) in the packet segmentation credit counter section 133*b* from "9" to "10".

Figure 11:
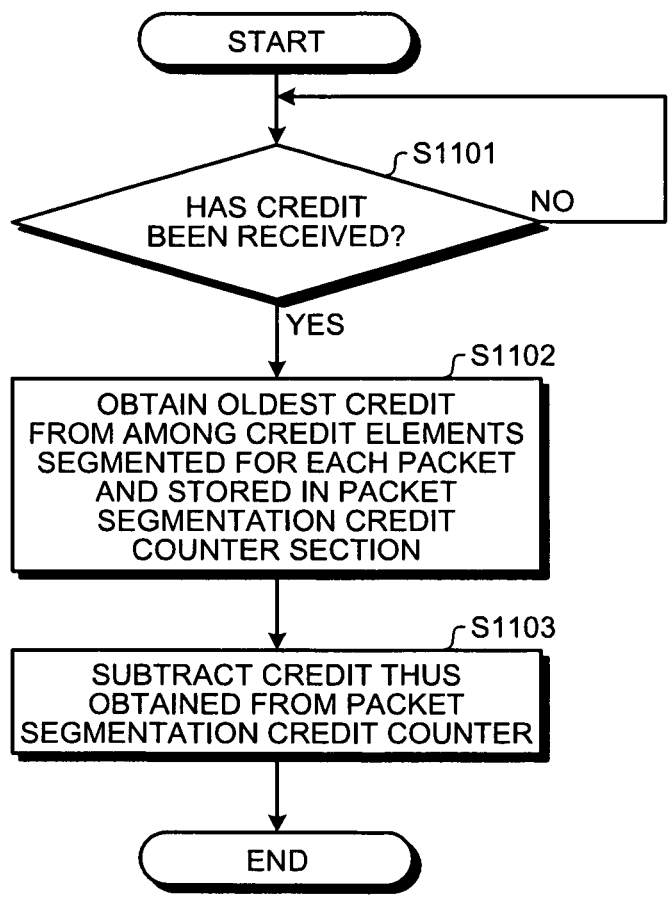
FIG. 11 is a flowchart of processing for receiving a credit according to the second embodiment.

Referring to FIG. 11, the following describes a procedure for receiving a credit according to the second embodiment. FIG. 11 is a flowchart of processing for receiving a credit according to the second embodiment.

As depicted in FIG. 11, when the transmitting apparatus 100 receives a credit from the receiving apparatus 200 (YES at Step S1101), the credit subtracting section 134*b* obtains a credit of the oldest data packet having been transmitted, from credit elements that have been stored in the packet segmentation credit counter section 133*b* in the order in which the respective packets have been transmitted (Step S1102).

The obtained credit is subtracted from the credit value stored in the packet segmentation credit counter section 133*b* and stored therein (Step S1103). Specifically, as depicted in FIG. 9, when receiving a credit "1", the transmitting apparatus 100 subtracts (removes) the oldest credit value among the credit elements stored in the packet segmentation credit counter section 133*b*, i.e., a credit "1", from the credit value in the packet segmentation credit counter section 133*b*. This makes the credit value (total) in the packet segmentation credit counter section 133*b* from "10" to "9".

Figure 12:
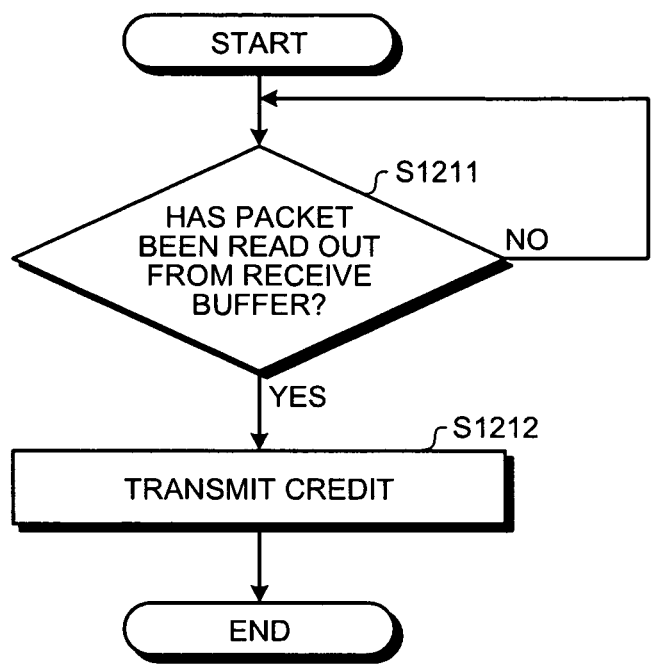
FIG. 12 is a flowchart of processing for transmitting a credit according to the second embodiment.

Referring to FIG. 12, the following describes a procedure for transmitting a credit according to the second embodiment. FIG. 12 is a flowchart of processing for transmitting a credit according to the second embodiment.

As depicted in FIG. 12, when the data output unit 220 reads out data stored in the receive buffer 210 of the receiving apparatus 200 (YES at Step S1211), a credit is transmitted to the packet segmentation credit counter section 133*b* regardless of the size of the read data (Step S1212). Specifically, when the receiving apparatus 200 reads out a data packet of 1 byte from the receive buffer 210, the credit transmitting section 231*b* transmits a credit "1" to the transmitting apparatus 100 regardless of the 1 byte read out from the receive buffer 210. When a data packet of 2 bytes is read, a credit "1" is transmitted to the transmitting apparatus 100 regardless of the 2 bytes read. When a data packet of 3 bytes is read, a credit "1" is transmitted to the transmitting apparatus 100 regardless of 3 bytes read.

As described, according to the data packet transmission and reception system according to the second embodiment, the credit transmitting section 231*b* transmits the size specifying information to the transmitting apparatus 100 regardless of the size of a data packet read out from the receive buffer 210. The credit adding section 132*b* adds a credit of a value corresponding to the size of the data packet transmitted to the receiving apparatus 200 to the credit stored in the packet segmentation credit counter section 133*b* and stores the resulting credit in the packet segmentation credit counter section 133*b*, in the order in which data packets have been transmitted. The credit subtracting section 134*b* subtracts a credit of the oldest data packet having been transmitted, from the credit elements that have been stored in the packet segmentation credit counter section 133*b* in the order in which the respective data packets have been transmitted, and stores the resulting credit in the packet segmentation credit counter section 133*b*. Thus, the transmitting apparatus 100 can grasp how the receive buffer 210 is congested with data packets, only by transmitting a credit of the same amount from the receiving apparatus 200 to the transmitting apparatus 100 regardless of the size of a data packet read out from the receive buffer 210. This enables to simplify the process for giving a response from the receiving apparatus 200 to the transmitting apparatus 100.

[c] Third Embodiment

The second embodiment describes subtraction of a credit in the order in which data packets have been transmitted. The present invention is not limited to this, and a credit may be subtracted by specifying a data packet. A third embodiment describes subtraction of a credit by specifying a data packet.

Figure 13:
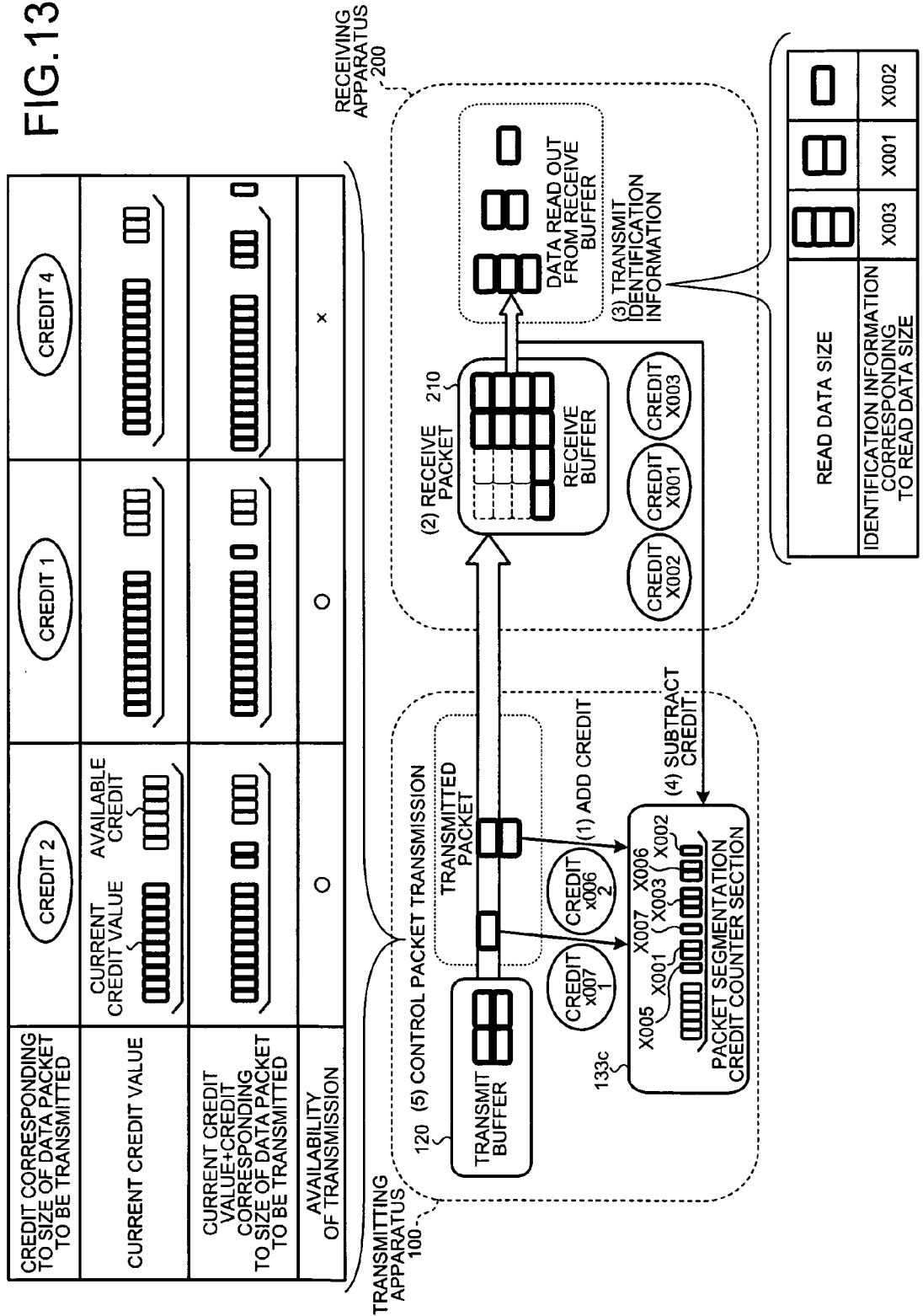
FIG. 13 is a drawing for explaining an overview and features of a data packet transmission and reception system according to a third embodiment.

Referring first to FIG. 13, an overview and features of a data packet transmission and reception system according to the third embodiment are described. FIG. 13 is a drawing for explaining an overview and features of the data packet transmission and reception system according to the third embodiment. Elements similar to those of the data packet transmission and reception systems according to the first and the second embodiments are described briefly.

The transmitting apparatus 100 transmits, from the transmit buffer 120 to the receiving apparatus 200, a data packet with the addition of identification information for uniquely identifying the data packet to be transmitted. Thereupon, the transmitting apparatus 100 segments a credit of a value corresponding to the size of each transmitted data packet, and adds identification information, so as to add the credit and store the resulting credit in a packet segmentation credit counter section 133*c* (see (1) in FIG. 13). Specifically, as depicted in FIG. 13, when transmitting a data packet of 1 byte with the addition of identification information "x007", the transmitting apparatus 100 associates the identification information "x007" with a credit "1" corresponding to the data size of 1 byte, so as to add the credit and store the resulting credit therein.

On the other hand, the receiving apparatus 200 receives, at the receive buffer 210, the data packet transmitted from the transmitting apparatus 100 (see (2) in FIG. 13). The receiving apparatus 200 then reads out the received data packet from the receive buffer 210, and transmits the identification information added to the packet read out from the receive buffer 210 to the transmitting apparatus 100 (see (3) in FIG. 13). Specifically, when reading out a data packet of 1 byte with the addition of identification information "x002" from the receive buffer 210, the receiving apparatus 200 transmits the identification information "x002" added to the data of 1 byte to the transmitting apparatus 100.

When receiving the identification information transmitted from the receiving apparatus 200, the transmitting apparatus 100 subtracts a credit of a data packet corresponding to the identification information received from the receiving apparatus 200, from credit elements that have been segmented for each data packet and stored with the addition of identification information into the packet segmentation credit counter section 133*c*, and stores the resulting credit in the packet segmentation credit counter section 133*c* (see (4) in FIG. 1). Specifically, as depicted in FIG. 13, when receiving identification information "x002", the transmitting apparatus 100 subtracts a credit "1" corresponding to the identification information "x002" from the credit value in the packet segmentation credit counter section 133*c*, and stores the resulting credit therein.

The transmitting apparatus 100 controls the transmission of data packets by permission and suspension of the transmission based on the credit value stored in the packet segmentation credit counter section 133c (see (5) in FIG. 13).

As such, in the data packet transmission and reception system according to the third embodiment, the transmitting apparatus 100 can grasp how the receive buffer 210 is congested with data packets, only by transmitting the identification information of the packet from the receiving apparatus 200 to the transmitting apparatus 100 regardless of the size of a data packet read out from the receive buffer 210. This enables to simplify the process for giving a response from the receiving apparatus 200 to the transmitting apparatus 100. Further, the size of the data packet read out from the receive buffer 210 can be reliably specified only by transmitting the identification information of the packet from the receiving apparatus 200 to the transmitting apparatus 100. This enables the transmitting apparatus 100 to reliably grasp how the receive buffer 210 is congested with data packets.

Figure 14:
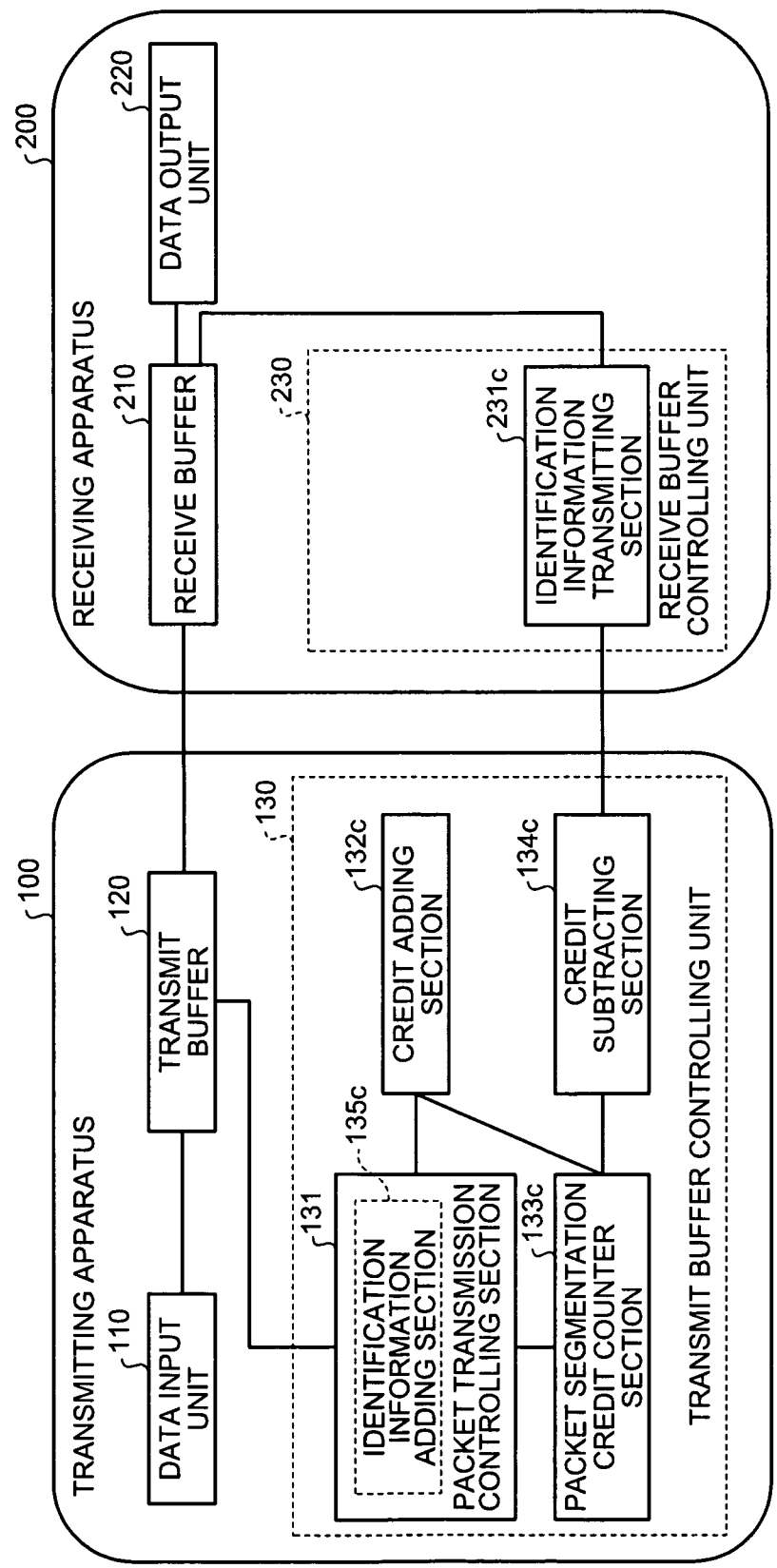
FIG. 14 is a schematic block diagram of the data packet transmission and reception system according to the third embodiment.

Referring to FIG. 14, the following describes a configuration of a data packet transmission and reception system according to the third embodiment. FIG. 14 is a schematic block diagram of the data packet transmission and reception system according to the third embodiment. As depicted in FIG. 14, the data packet transmission and reception system includes the transmitting apparatus 100 and the receiving apparatus 200. The transmitting apparatus 100 includes the data input unit 110, the transmit buffer 120, and the transmit buffer controlling unit 130. The receiving apparatus 200 includes the receive buffer 210, the data output unit 220, and the receive buffer controlling unit 230.

Elements performing the same operations as in the first and the second embodiments are given the same numerals and descriptions thereof are omitted here. The following only describes the packet segmentation credit counter section 133c, an identification information adding section 135c, a credit adding section 132c, a credit subtracting section 134c, and an identification information transmitting section 231c.

The packet segmentation credit counter section 133c stores therein, as a credit, a value corresponding to a total size of all data packets currently stored in the capacity of the receive buffer 210. Specifically, the packet segmentation credit counter section 133c stores therein the stored credit as credit elements segmented for each packet with the addition of identification information, as described later (see FIG. 15).

When the packet transmission controlling section 131 permits transmission of a data packet, the identification information adding section 135c adds, to the data packet to be transmitted, identification information for uniquely identifying the data packet. Specifically, identification information such as "x006" or "x007" is added into the data packet to be transmitted.

When a data packet is transmitted from the transmit buffer 120 to the receiving apparatus 200, the credit adding section 132c segments a credit of a value, corresponding to the size of the data packet transmitted to the receiving apparatus 200, for each data packet, and associates the credit with the identification information added by the identification information adding section 135c to the data packet. In this way, the credit adding section 132c adds the credit to the credit stored in the packet segmentation credit counter section 133c and stores the resulting credit in the packet segmentation credit counter section 133c.

Figure 15:
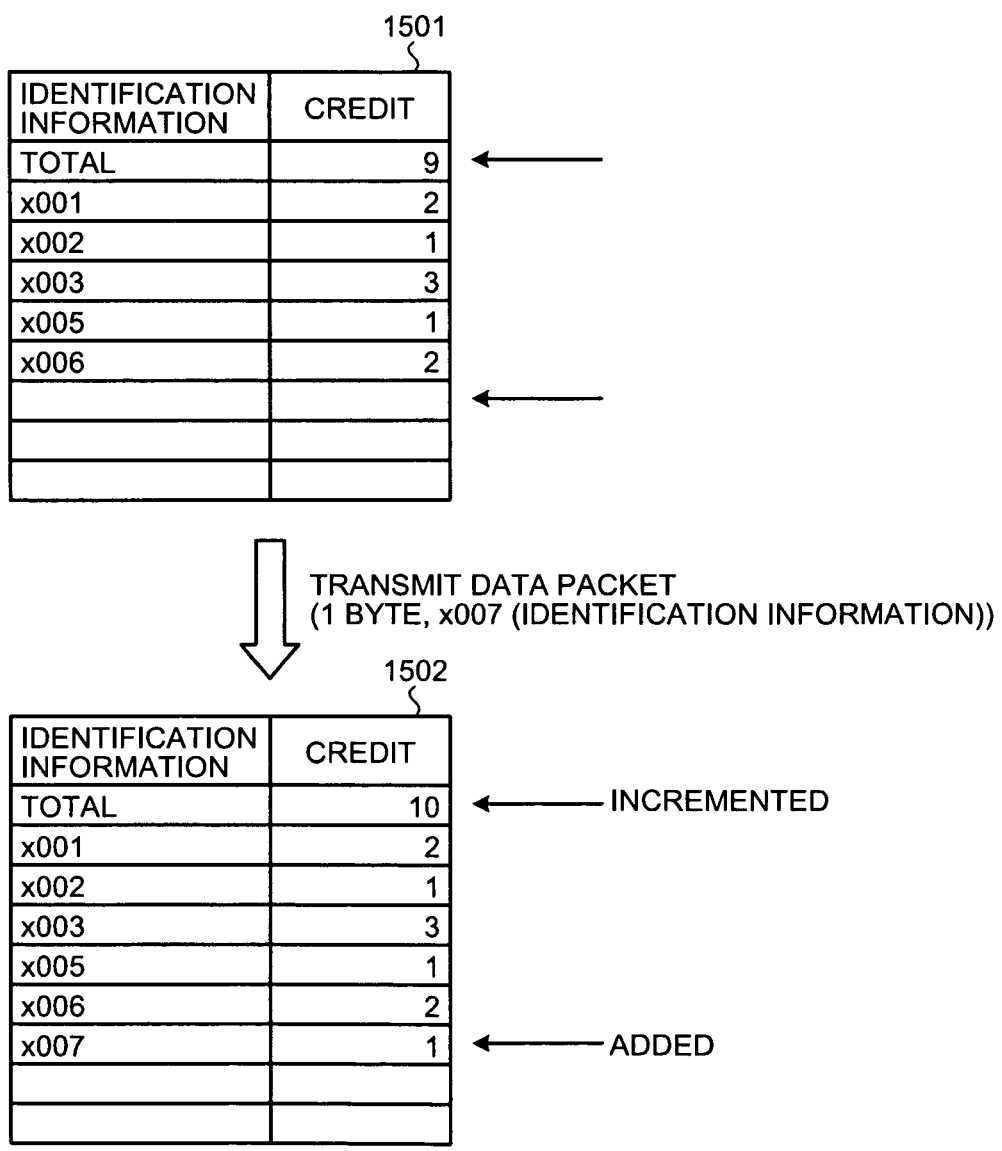
FIG. 15 is a conceptual diagram of processing for adding a credit according to the third embodiment.

As depicted in FIG. 15 for example, at transmission timing, when the transmitting apparatus 100 transmits a data packet of 2 bytes with the addition of identification information "x006" from the transmit buffer 120, the credit adding section 132c adds the identification information "x006" to a credit corresponding to 2 bytes, i.e., a credit "2", so as to add the credit to the credit value in the packet segmentation credit counter section 133c and store the resulting credit in the packet segmentation credit counter section 133c. When the transmitting apparatus 100 transmits a data packet of 1 byte with the addition of identification information "x007" from the transmit buffer 120, the credit adding section 132c adds the identification information "x007" to a credit corresponding to 1 byte, i.e., a credit "1", so as to add the credit to the credit value in the packet segmentation credit counter section 133c and store the resulting credit in the packet segmentation credit counter section 133c. FIG. 15 is a conceptual diagram of processing for adding a credit according to the third embodiment.

When receiving identification information from the receiving apparatus 200, the credit subtracting section 134c subtracts a credit of a data packet corresponding to the identification information received from the receiving apparatus 200 from credit elements that have been segmented for each data packet and stored with the addition of the identification information into the packet segmentation credit counter section 133c, and stores the resulting credit in the packet segmentation credit counter section 133c.

Figure 16:
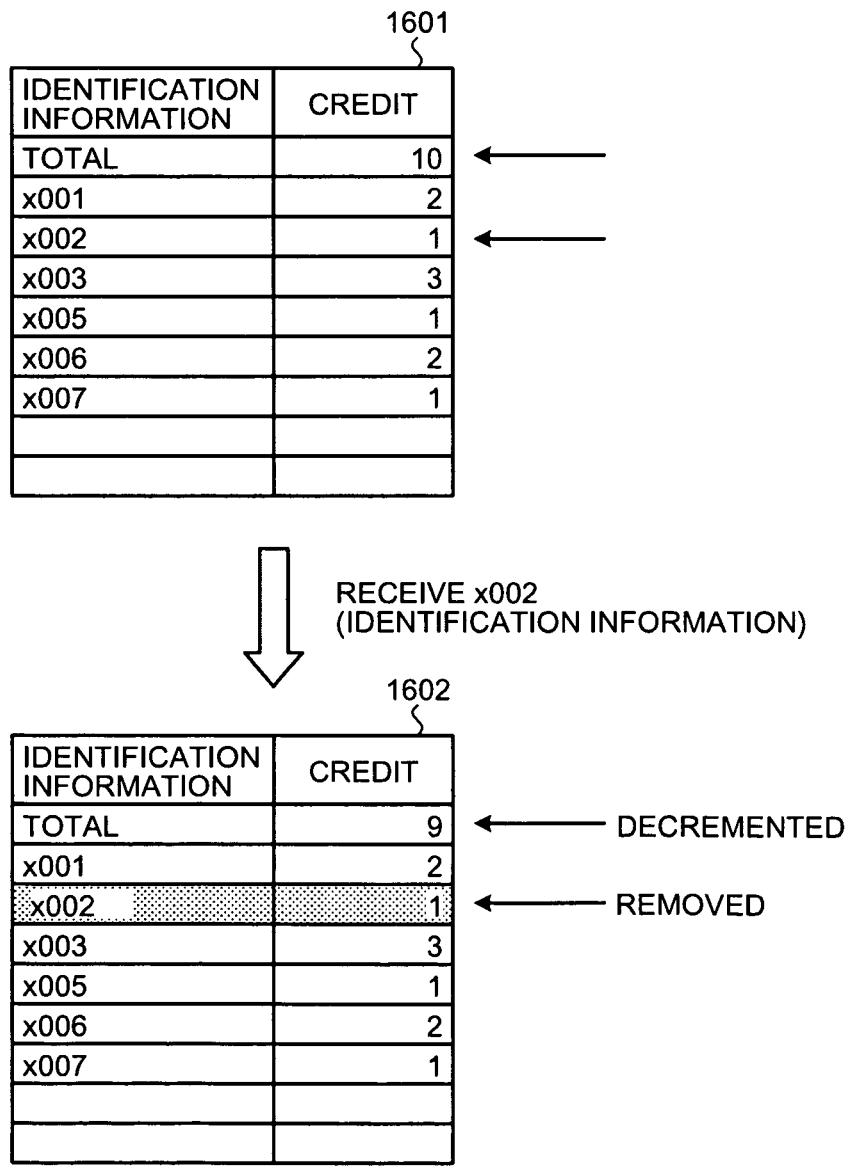
FIG. 16 is a conceptual diagram of processing for subtracting a credit according to the third embodiment.

As depicted in FIG. 16 for example, when receiving identification information "x002", the credit subtracting section 134c subtracts a credit "1" corresponding to the identification information "x002" from the credit value in the packet segmentation credit counter section 133c. When receiving identification information "x001", the credit subtracting section 134c subtracts a credit "2" corresponding to the identification information "x001" from the credit value in the packet segmentation credit counter section 133c. When receiving identification information "x003", the credit subtracting section 134c subtracts a credit "3" corresponding to the identification information "x003" from the credit value in the packet segmentation credit counter section 133c. FIG. 16 is a conceptual diagram of processing for subtracting a credit according to the third embodiment.

Regardless of the size of a data packet read out from the receive buffer 210, the identification information transmitting section 231c transmits identification information added to the data packet to the transmitting apparatus 100.

Figure 17:
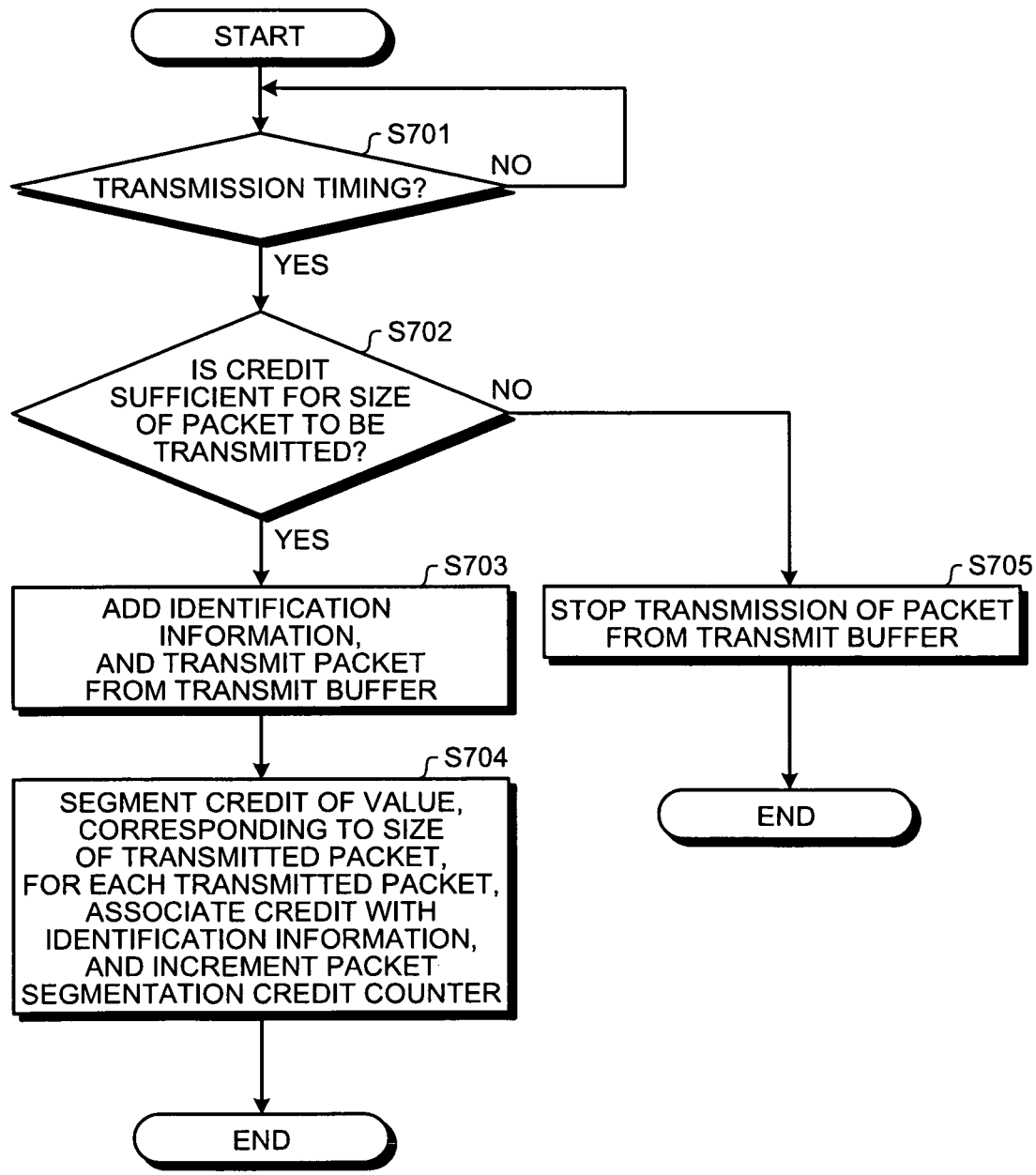
FIG. 17 is a flowchart of processing for transmitting a packet according to the third embodiment.

Referring to FIG. 17, the following describes a procedure for transmitting a packet according to the third embodiment. FIG. 17 is a flowchart of processing for transmitting a packet according to the third embodiment. Elements similar to those of the data packet transmission and reception systems according to the first and the second embodiments are described briefly.

As depicted in FIG. 17, at transmission timing, if the packet segmentation credit counter section 133c has a sufficient credit for the size of a data packet to be transmitted (if the sum value has not reached the upper limit) (YES at Step S701 to Step S702), the identification information adding section 135c adds identification information for uniquely discriminating the data packet to be transmitted, and the packet transmission controlling section 131 transmits the data packet with the addition of the identification information from the transmit buffer 120 (Step S703).

When the transmitting apparatus 100 transmits a data packet from the transmit buffer 120, the credit adding section 132c segments a credit, corresponding to the size of the transmitted data packet, for each transmitted data packet and associates the credit with identification information, so as to add the credit to the credit stored in the packet segmentation credit counter section 133c and store the resulting credit in the packet segmentation credit counter section 133c (Step S704). Specifically, the credit adding section 132c segments a credit of a value, corresponding to the size of the data packet transmitted to the receiving apparatus 200, for each data packet and adds identification information, so as to add the credit to the credit stored in the packet segmentation credit counter section 133c and store the resulting credit in the packet segmentation credit counter section 133c.

Figure 18:
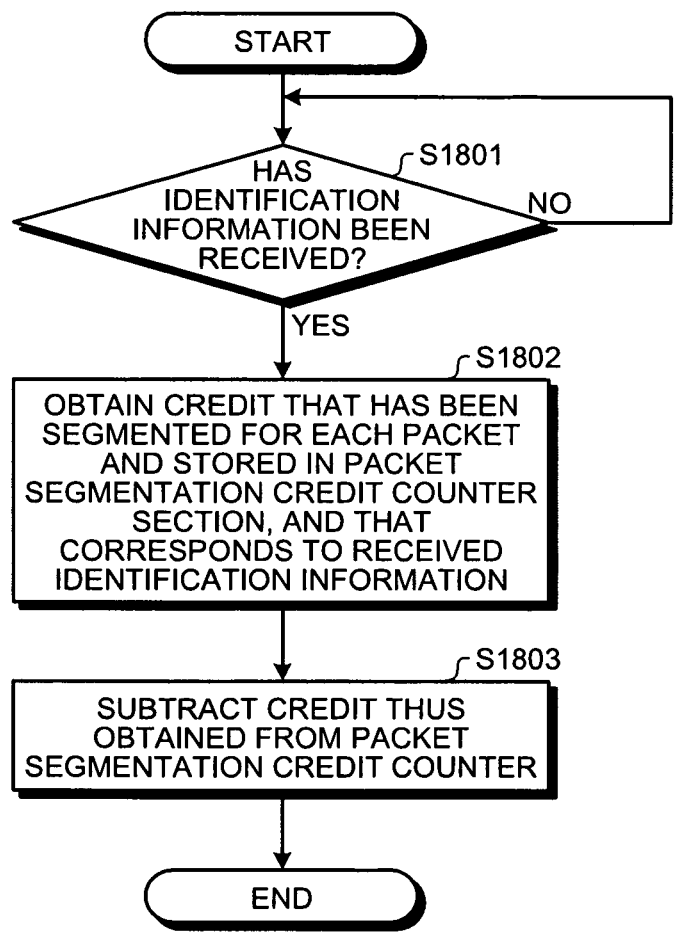
FIG. 18 is a flowchart of processing for receiving a credit according to the third embodiment.

Referring to FIG. 18, the following describes a procedure for receiving a credit according to the third embodiment. FIG. 18 is a flowchart of processing for receiving a credit according to the third embodiment.

As depicted in FIG. 18, when the transmitting apparatus 100 receives identification information from the receiving apparatus 200 (YES at Step S1801), the credit subtracting section 134c obtains a credit that has been segmented for each packet and stored in the packet segmentation credit counter section 133c, and that corresponds to the received identification information (Step S1802). Specifically, the credit subtracting section 134c obtains a credit that corresponds to the identification information received from the receiving apparatus 200, from credit elements that have been segmented for each data packet and stored with the addition of the identification information into the packet segmentation credit counter section 133c.

For example, when receiving identification information "x002", the transmitting apparatus 100 obtains a credit "1" corresponding to the identification information "x002". When receiving identification information "x001", the transmitting apparatus 100 obtains a credit 2 corresponding to the identification information "x001". When receiving identification information "x003", the transmitting apparatus 100 obtains a credit "3" corresponding to the identification information "x003" (see FIG. 16).

The credit obtained as such is subtracted from the credit value stored in the packet segmentation credit counter section 133c and stored therein (Step S1803). Specifically, as depicted in FIG. 16, when receiving identification information "x002", the transmitting apparatus 100 subtracts a credit "1" corresponding to the identification information "x002" from the credit value in the packet segmentation credit counter section 133c, and stores the resulting credit therein.

Figure 19:
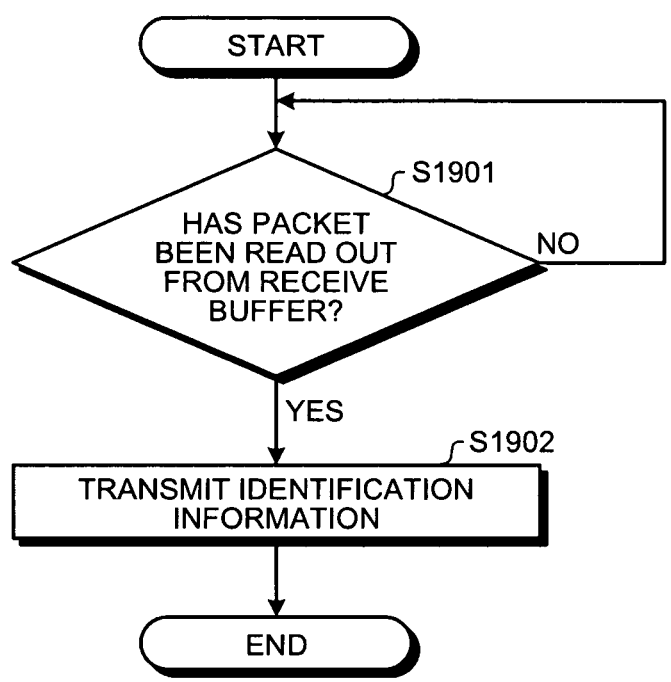
FIG. 19 is a flowchart of processing for transmitting identification information according to the third embodiment.

Referring to FIG. 19, the following describes a procedure for transmitting a credit according to the third embodiment. FIG. 19 is a flowchart of processing for transmitting a credit according to the third embodiment.

As depicted in FIG. 19, when the data output unit 220 reads out data stored in the receive buffer 210 of the receiving apparatus 200 (YES at Step S1901), the identification information added to the read data packet is transmitted to the packet segmentation credit counter section 133c (Step S1902).

As described, according to the third embodiment, when permitting transmission of a data packet, the packet transmission controlling section 131 adds identification information for uniquely identifying the data packet to the data packet to be transmitted, so as to transmit the data packet to the receiving apparatus 200. The identification information transmitting section 231c transmits the identification information added to the data packet to the transmitting apparatus 100, regardless of the size of the data packet read out from the receive buffer 210. The credit adding section 132c segments a credit of a value, corresponding to the size of the data packet transmitted to the receiving apparatus 200, for each data packet and adds identification information, so as to add the credit to the credit stored in the packet segmentation credit counter section 133c and store the resulting credit in the packet segmentation credit counter section 133c. The credit subtracting section 134c subtracts a credit of a data packet corresponding to the identification information received from the receiving apparatus 200 from credit elements that have been segmented for each data packet and stored with the addition of the identification information into the packet segmentation credit counter section 133c, and stores the resulting credit in the packet segmentation credit counter section 133c. Thus, the transmitting apparatus 100 can grasp how the receive buffer 210 is congested with data packets, only by transmitting identification information of the packet from the receiving apparatus 200 to the transmitting apparatus 100 regardless of the size of a data packet read out from the receive buffer 210. This enables to simplify the process for giving a response from the receiving apparatus 200 to the transmitting apparatus 100. Further, the size of the data packet read out from the receive buffer 210 can be reliably specified only by transmitting the identification information of the packet from the receiving apparatus 200 to the transmitting apparatus 100. This enables to reliably grasp how the receive buffer 210 is congested with data packets.

[d] Fourth Embodiment

The foregoing describes the data packet transmission and reception systems according to the first to the third embodiments. The present invention may be practiced in various different embodiments other than the above embodiments. The following describes a different embodiment, as a data packet transmission and reception system according to a fourth embodiment.

[d-1] Method for Determining Transmission

The above embodiments describe data packet transmission controlled by determining whether the sum value of credit values, obtained by adding a credit value corresponding to the size of a data packet to be transmitted from the transmitting apparatus, has reached a predetermined value (an upper limit) determined depending on the capacity of the receive buffer. The present invention is not limited to this, and may also be applied similarly to data packet transmission controlled by determining whether a predetermined value (an upper limit) determined depending on the capacity of the receive buffer is reached.

Specifically, a packet transmission controlling section determines whether a credit value stored in a credit counter section has reached a predetermined value (an upper limit) determined depending on the capacity of a receive buffer. When the credit value has not reached the upper limit, the packet transmission controlling section permits transmission of a data packet. If the credit value has reached the upper limit, the packet transmission controlling section controls the transmission by stopping the transmission of the data packet.

In this way, data packet transmission can be controlled by, for example, setting a value resulting from subtracting the maximum length sizes of data packets from the capacity of the receive buffer as an upper limit of the credit counter, and then by determining whether the credit exceeds this upper limit. This enables to simplify the process for permitting or stopping transmission of the packet.

[d-2] Application to Computer System

Figure 20:
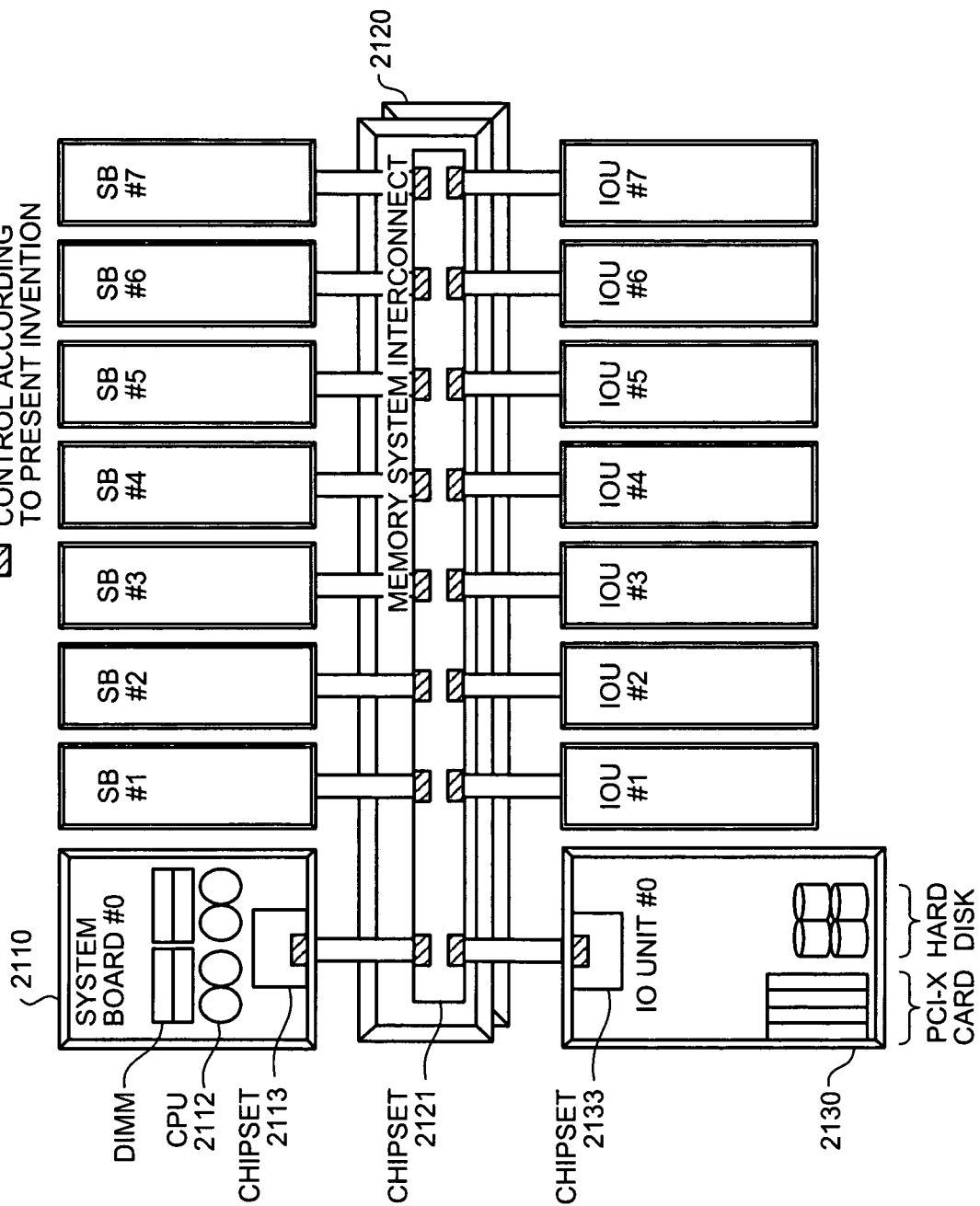
FIG. 20 is an exemplary view of a computer system to which the present invention is applied.

The above embodiments describe a data packet transmission and reception system including a transmitting apparatus and a receiving apparatus provided separately. The present invention is not limited to this, and may also be applied similarly to data packet transmission between circuits inside a computer system. For example, FIG. 20 is an exemplary view of a computer system to which the present invention is applied. As depicted in FIG. 20, a chipset 2113, a chipset 2121, and a chipset 2133 employ control according to the present invention. The present invention may be applied to data packet transmission and reception between a system board 2110 and a memory system interconnect 2120, and to data packet transmission and reception between the memory system interconnect 2120 and an input-output (IO) unit 2130.

[d-2] Size Specifying Information

The above embodiments describe a system that newly adds identification information of packet data. The present invention is not limited to this, and may also be applied similarly to a method using given information that is contained in advance in a data packet to be transmitted, and to a method using both such given information and identification information of a data packet.

[d-3] System Configuration

The above embodiments describe a data packet transmission and reception system including one transmitting apparatus and one receiving apparatus. The present invention is not limited to this, and may also be applied similarly to a system including one transmitting apparatus and a plurality of receiving apparatuses, and to a system including a plurality of transmitting apparatuses and one receiving apparatus.

The above embodiments describe a transmitting apparatus and a receiving apparatus serving as different terminals. The present invention is not limited to this, and may also be applied similarly to a terminal realized as both a transmitting apparatus and a receiving apparatus (one terminal having both the functions of a transmitting apparatus and the functions of a receiving apparatus).

Constituting elements of the devices shown in the drawings are ideational functions, and their physical arrangements are not necessarily the same as those shown in the drawings. Specifically, the arrangement of distributing and integrating the devices is not limited to those specifically shown in the drawings. For example, the transmit buffer controlling section and the receive buffer controlling section may be removed from the transmitting apparatus and the receiving apparatus, and alternatively a device may be provided that controls transmission and reception of a data packet. Further, all of or any portion of the devices can be distributed and integrated concerning functional and physical aspects based on given units with various loads and use conditions taken into account. For example, the credit adding section and the credit subtracting section may be integrated. Further, as to processing functions performed by the devices, all of or any portion of the functions may be implemented by central processing units (CPUs) and computer programs readable and executable by the CPUs, or implemented in hardware using wired logic. In addition, the processing procedures, controlling procedures, specific names, and information including various kinds of data and parameters (e.g., information illustrated in FIGS. 8 and 9) illustrated in the description and the drawings may be changed in any way unless otherwise specified.

[d-4] Data Packet Transmission and Reception Program

Figure 21:
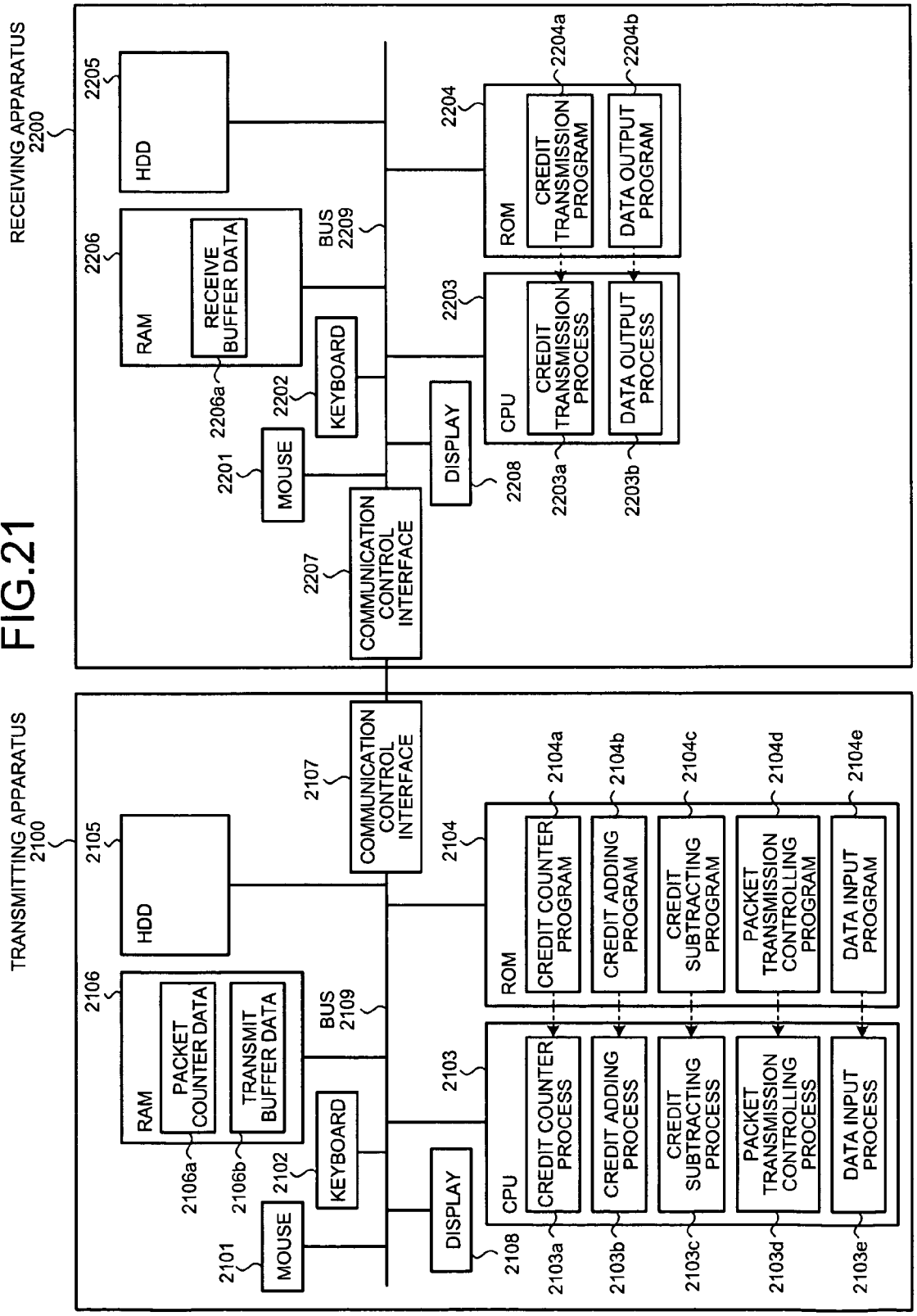
FIG. 21 is a drawing of a computer program in the data packet transmission and reception system according to the first embodiment.
Figure 22:
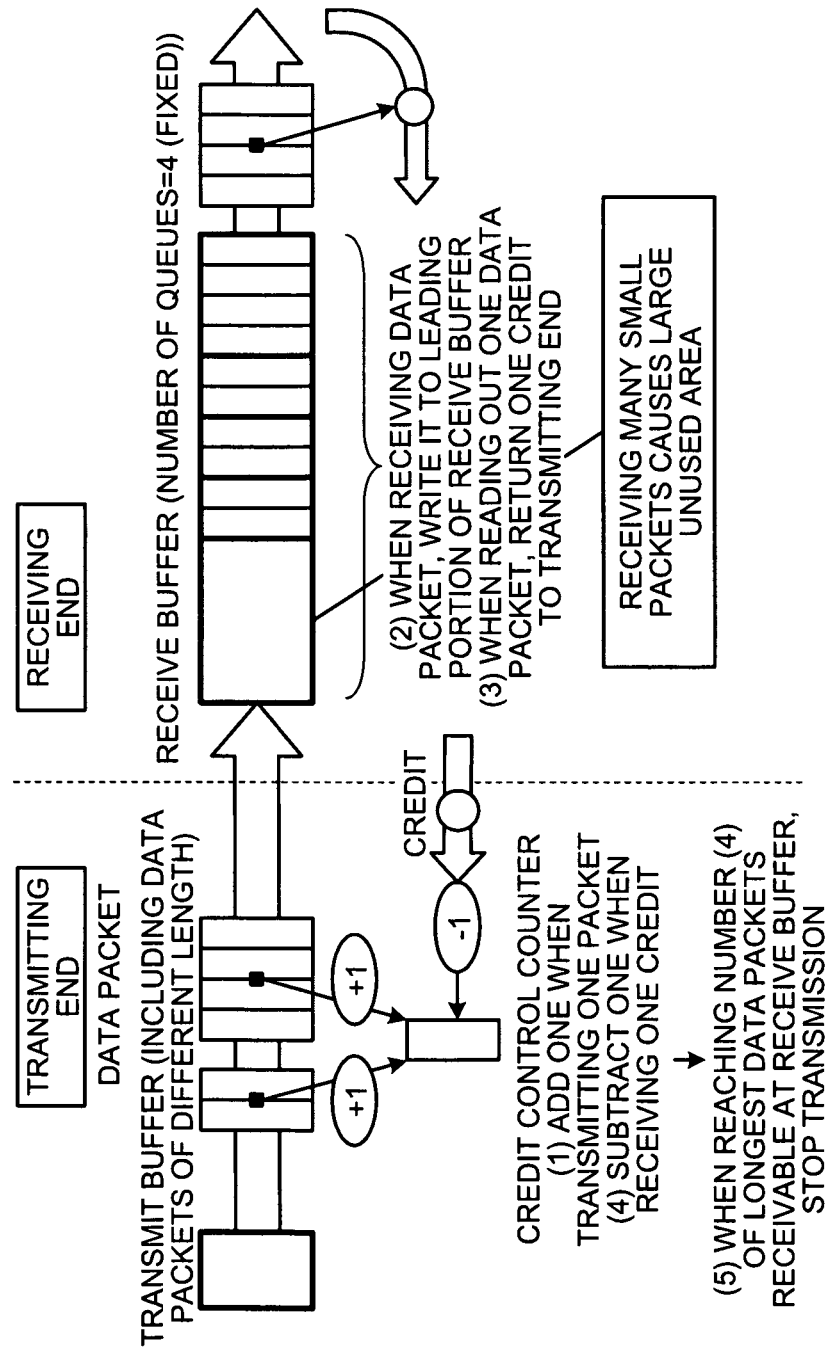
FIG. 22 is a drawing for explaining an overview and features of a data packet transmission control system according to a conventional technique.

The first embodiment describes various processes implemented in hardware logic. The present invention is not limited to this, and may be realized by executing a prepared computer program on a computer. Referring to FIG. 21, the following describes an example of a computer that executes a data packet transmission and reception program including the same functions as the data packet transmission and reception system shown in the first embodiment. FIG. 21 is a drawing of a computer program in the data packet transmission and reception system according to the first embodiment.

As depicted in FIG. 21, a transmitting apparatus 2100 includes a mouse 2101, a keyboard 2102, a CPU 2103, a read only memory (ROM) 2104, a hard disk drive (HDD) 2105, a random access memory (RAM) 2106, a communication control interface 2107, and a display 2108 which are connected via a bus 2109 and the like. A receiving apparatus 2200 includes a mouse 2201, a keyboard 2202, a CPU 2203, a ROM 2204, a RAM 2206, a HDD 2205, a communication control interface 2207, and a display 2208 which are connected via a bus 2209 and the like. The transmitting apparatus 2100 and the receiving apparatus 2200 are connected at the communication control interface 2107 and the communication control interface 2207, via a network or wired communication, or wirelessly (infrared communication, Bluetooth, or the like).

The ROM 2104 stores therein in advance transmit buffer control programs realizing the same functions as the transmit buffer controlling unit 130 and the data input unit 110, i.e., a credit counter program 2104a, a credit adding program 2104b, a credit subtracting program 2104c, a packet transmission control program 2104d, and a data input program 2104e, as depicted in FIG. 21. These programs 2104a to 2104e may be integrated or separated appropriately, as in the constituting elements of the transmitting apparatus 100 depicted in FIG. 2.

As the CPU 2103 reads out these programs 2104a to 2104e from the ROM 2104 and executes them, accordingly these programs 2104a to 2104e function as a credit counter process 2103a, a credit adding process 2103b, a credit subtracting process 2103c, a packet transmission controlling process 2103d, and a data input process 2103e as depicted in FIG. 21. These processes 2103a to 2103e respectively correspond to the credit counter section 133, the credit adding section 132, the credit subtracting section 134, the packet transmission controlling section 131, and the data input unit 110 depicted in FIG. 2.

The CPU 2103 executes the transmit buffer control programs based on packet counter data 2106a and transmit buffer data 2106b, stored in the RAM 2106.

The ROM 2204 stores therein in advance receive buffer control programs realizing the same functions as the receive buffer controlling unit 230 and the data output unit 220 shown in the first embodiment, i.e., a credit transmission program 2204a and a data output program 2204b, as depicted in FIG. 21. The programs 2204a and 2204b may be integrated or separated appropriately as in the constituting elements of the receiving apparatus 200 depicted in FIG. 2.

As the CPU 2203 reads out the programs 2204a and 2204b from the ROM 2204 and executes them, accordingly the programs 2204a and 2204b function as a credit transmission process 2203a and a data output process 2203b as depicted in FIG. 21. The processes 2203a to 2203b respectively correspond to the credit transmitting section 231 and the data output unit 220 depicted in FIG. 2.

The CPU 2203 executes the receive buffer control programs based on receive buffer data 2206a stored in the RAM 2206.

The programs 2104a to 2104e and 2204a to 2204b described in the present embodiment need not always be stored in the ROMs initially. For example, the programs may be stored in advance in: a "carrying physical medium" to be inserted to the transmitting apparatus 2100 or the receiving apparatus 2200, such as a flexible disk, a compact disk read only memory (CD-ROM), a magneto-optical (MO) disk, a digital versatile disk (DVD), a magnet-optical disk, or an integrated circuit (IC) card; a "fixed physical medium" such as a HDD provided inside or outside the transmitting apparatus 2100 or the receiving apparatus 2200; "other computers (or servers)" connected to the transmitting apparatus 2100 or the receiving apparatus 2200 via a public line, the Internet, a local area network (LAN), a wide area network (WAN), or the like. Then, the programs may be read out and executed by the transmitting apparatus 2100 or the receiving apparatus 2200.

According to one embodiment, a receiving apparatus transmits, when a data packet stored in a receive buffer is read, size specifying information is transmitted to a transmitting apparatus, and the transmitting apparatus stores therein, as a credit, a value corresponding to a total size of all data packets currently stored in a capacity of the receive buffer. When the data packet is transmitted from a transmit buffer to the receiving apparatus, the transmitting apparatus adds a credit of a value corresponding to a size of a transmitted data packet to the current credit, and stores a resulting credit in a credit storage unit. When the size specifying information is transmitted from the receiving apparatus, the transmitting apparatus specifies, using the size specifying information, a size of a data packet read out from the receive buffer, subtracts a credit of a value corresponding to the size thus specified from the current credit, and stores a resulting credit in the credit storage unit. The transmitting apparatus controls the transmission of data packets by permission or suspension based on a value of a credit stored in the credit storage unit. As such, the transmitting apparatus grasps how the receive buffer is congested with data packets based on the data size, not on the number of data packets, and transmits data packets while dynamically adjusting the number of data packets (the number of queues) to be stored in the receive buffer to make it fall within a range not causing overflow of the data packets. Accordingly, an unused area can be reduced in the receive buffer, so that resources of the receive buffer can be used efficiently.

According to one embodiment, the receiving apparatus transmits, as the size specifying information, a credit of a value corresponding to a size of a data packet read out from the receive buffer to the transmitting apparatus, and the transmitting apparatus adds a credit of a value corresponding to a size of a data packet transmitted to the receiving apparatus to the current credit, and stores a resulting credit in the credit storage unit. The transmitting apparatus subtracts the credit of the value received from the receiving apparatus from the current credit, and stores the credit. Accordingly, the transmitting apparatus can grasp how the receive buffer is congested with data packets, only by subtracting the credit received from the receiving apparatus. This enables to simplify the process for incrementing and decrementing the credit in the transmitting apparatus.

According to one embodiment, the receiving apparatus transmits the size specifying information to the transmitting apparatus regardless of a size of a data packet read out from the receive buffer. The transmitting apparatus adds a credit of a value corresponding to a size of a data packet transmitted to the receiving apparatus to the current credit and stores a resulting credit in the credit storage unit, in the order in which data packets have been transmitted. The transmitting apparatus subtracts a credit of an oldest data packet having been transmitted from among credit elements that have been stored in the credit storage unit in the order in which data packets have been transmitted, and stores a resulting credit in the credit storage unit. In the receiving apparatus, how the receive buffer is congested with data packets is grasped only by transmitting a credit of the same amount from the receiving apparatus to the transmitting apparatus each time regardless of the size of the data packet read out from the receive buffer. Thus, the process for giving a response from the receiving apparatus to the transmitting apparatus can be simplified.

According to one embodiment, the transmitting apparatus adds, when permitting transmission of the data packet, identification information for uniquely identifying the data packet to be transmitted to the data packet, and transmits the data packet to the receiving apparatus, and the receiving apparatus transmits the identification information added to the data packet to the transmitting apparatus regardless of a size of a data packet read out from the receive buffer. The transmitting apparatus segments a credit of a value, corresponding to a size of a data packet transmitted to the receiving apparatus, for each data packet and adds the identification information, so as to add the credit to the current credit and store a resulting credit in the credit storage unit. The transmitting apparatus subtracts a credit of a data packet corresponding to identification information received from the receiving apparatus, from credit elements segmented for each data packet and stored with the addition of the identification information into the credit storage unit, and stores a resulting credit in the credit storage unit. In the receiving apparatus, how the receive buffer is congested with data packets is grasped only by transmitting the identification information of the packet from the receiving apparatus to the transmitting apparatus regardless of the size of the data packet read out from the receive buffer. Thus, the process for giving a response from the receiving apparatus to the transmitting apparatus can be simplified. Further, the size of the data packet read out from the receive buffer can be reliably specified only by transmitting the identification information of the packet from the receiving apparatus to the transmitting apparatus. This enables to reliably grasp how the receive buffer is congested with data packets.

According to one embodiment, the transmitting apparatus determines whether a sum value, obtained by adding a value of a credit corresponding to a size of a data packet to be transmitted from the transmitting apparatus to a value of the current credit, has reached a predetermined value determined depending on a capacity of the receive buffer, so as to control to permit transmission of the data packet when the sum value has not reached the predetermined value or to stop transmission of the data packet when the sum value has reached the predetermined value. Accordingly, estimation can be made as to how the receive buffer is congested with data packets after the data packet to be transmitted is transmitted. This reliably prevents the overflow at the receive buffer.

According to one embodiment, the transmitting apparatus determines whether a value of the current credit has reached a predetermined value determined depending on a capacity of the receive buffer, so as to control to permit transmission of the data packet when the value of the credit has not reached the predetermined value or to stop transmission of the data packet when the value of the credit has reached the predetermined value. For example, data packet transmission can be controlled by setting, as an upper limit for a credit counter, a value obtained by subtracting a maximum length size of the data packet from the capacity of the receive buffer, and then by determining whether the credit exceeds this upper limit. This enables to simplify the process for permitting or stopping transmission of the packet.

According to one embodiment, a receiving apparatus includes a receive buffer storing therein a data packet, reads out a data packet stored in the receive buffer, and transmits, when the data packet stored in the receive buffer is read, size specifying information used to specify a size of a read data packet to the transmitting apparatus. Because the transmitting apparatus controls to permit or stop transmission of the data packet based on the current credit, the transmitting apparatus grasps how the receive buffer is congested with data packets based on the data size, not on the number of data packets, so as to transmit data packets while dynamically adjusting the number of data packets (the number of queues) to be stored in the receive buffer to make it fall in a range not causing overflow of the data packets. Accordingly, an unused area can be reduced in the receive buffer, so that resources of the receive buffer can be used efficiently.

According to one embodiment, the receiving apparatus transmits, as the size specifying information, a credit of a value corresponding to a size of a data packet read out from the receive buffer to the transmitting apparatus. Thus, the transmitting apparatus adds the credit of the value corresponding to the size of the data packet transmitted to the receiving apparatus to the current credit and stores a resulting credit in the credit storage unit, and the transmitting apparatus subtracts the credit of the value received from the receiving apparatus from the current credit and stores a resulting credit in the credit storage unit. Accordingly, the transmitting apparatus can grasp how the receive buffer is congested with data packets, only by subtracting the credit received from the receiving apparatus. This enables to simplify the process for incrementing and decrementing the credit in the transmitting apparatus.

According to one embodiment, a transmitting apparatus stores therein, as a credit, a value corresponding to a total size of all data packets stored in a receive buffer. When a data packet is transmitted to a receiving apparatus, the transmitting apparatus adds a credit of a value corresponding to a size of a transmitted data packet to the current credit. The transmitting apparatus subtracts, based on size specifying information received from the receiving apparatus and specifying a size of a data packet read out from the receive buffer, a credit of a value corresponding to the size of the data packet read out from the receive buffer from the current credit. The transmitting apparatus controls to permit or stop transmission of the data packet based on a value of a credit stored in the credit storage unit. When the data packet stored in the receive buffer is read, the receiving apparatus transmits the size specifying information to the transmission apparatus. This enables the transmitting apparatus to grasp how the receive buffer is congested with data packets based on the data size, not on the number of data packets, so as to transmit data packets while dynamically adjusting the number of data packets (the number of queues) to be stored in the receive buffer to make it fall in a range not causing overflow with the data packets. Accordingly, an unused area can be reduced in the receive buffer, so that resources of the receive buffer can be used efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A system for transmitting and receiving a data packet, the system comprising:
a receiving apparatus that is adapted to receive a transmitted data packet, the receiving apparatus including
a receive buffer that stores a data packet therein, and
a size specifying information transmitting unit that transmits to a transmitting apparatus, when a data packet stored in the receive buffer is read, size specifying information which does not correspond with the size of the data packet read, the data packet being read out in an order that the receiving apparatus receives the data packet; and
a transmitting apparatus that is adapted to transmit a data packet to the receiving apparatus, the transmitting apparatus including
a transmit buffer that stores a data packet therein,
a credit storage that stores a credit count being a value corresponding with a total size of all data packets currently stored in a capacity of the receive buffer, and stores, when a data packet is transmitted to the receiving apparatus, a credit element having a value that corresponds to the size of the data packet,
a credit adding unit that increments the credit count by a value corresponding with the size of a data packet transmitted when the transmitting apparatus transmits the data packet,
a credit subtracting unit that decrements the credit count by a value corresponding to an oldest credit element stored in the credit storage and deletes the oldest credit element when the receiving apparatus transmits the size specifying information to the transmitting apparatus, and
a transmission controlling unit that controls permission and suspension of transmission of a data packet to be transmitted from the transmitting apparatus based on a value of the credit count stored in the credit storage.

2. The system according to claim 1, wherein,
the transmission controlling unit determines whether a sum value, obtained by adding the credit value of a data packet to be transmitted from the transmitting apparatus to the count credit stored in the credit storage, has reached a predetermined value determined depending on the capacity of the receive buffer, permits transmission of the data packet when the sum value has not reached the predetermined value, and suspends transmission of the data packet when the sum value has reached the predetermined value.

3. The system according to claim 1, wherein,
the transmission controlling unit determines whether the credit count stored in the credit storage has reached a predetermined value determined depending on the capacity of the receive buffer, permits transmission of the data packet when the credit count has not reached the predetermined value, and suspends transmission of the data packet when the credit count has reached the predetermined value.

4. A system for transmitting and receiving a data packet, the system comprising:
a receiving apparatus that is adapted to receive a data packet transmitted from a transmitting apparatus, the data packet including identification information being added thereto by the transmitting apparatus uniquely identifying the data packet, the receiving apparatus including
a receive buffer that stores a data packet therein, and
an identification information transmitting unit that transmits, when a data packet stored in the receive buffer is read, the identification information to the transmitting apparatus; and
the transmitting apparatus being adapted to transmit a data packet to the receiving apparatus, the transmitting apparatus including
a transmit buffer that stores a data packet therein,
a credit storage that stores a credit count being a value corresponding to a total size of all data packets currently stored in a capacity of the receive buffer, and stores, when a data packet is transmitted to the receiving apparatus, the identification information in association with a credit element having a value corresponding to the size of the data packet, a credit adding unit that increments the credit count by a value corresponding to a size of a data packet and stores in the credit storage a credit element of the data packet when the transmitting apparatus transmits the data packet, a credit subtracting unit that decrements, when the identification information is received from the receiving apparatus, the credit count by the value of the credit element that is associated with the received identification information, and a transmission controlling unit that controls permission and suspension of transmission of a data packet to be transmitted from the transmitting apparatus based on the value of the credit count, adds the identification information to the data packet when permitting transmission of the data packet, and transmits the data packet to the receiving apparatus.

5. The system according to claim 4, wherein, the transmission controlling unit determines whether a sum value, obtained by adding the credit value of a data packet to be transmitted from the transmitting apparatus to the credit count stored in the credit storage, has reached a predetermined value determined depending on the capacity of the receive buffer, permits transmission of the data packet when the sum value has not reached the predetermined value, and suspends transmission of the data packet when the sum value has reached the predetermined value.

6. The system according to claim 4, wherein, the transmission controlling unit determines whether the credit count stored in the credit storage has reached a predetermined value determined depending on the capacity of the receive buffer, permits transmission of the data packet when the credit count has not reached the predetermined value, and suspends transmission of the data packet when the credit count has reached the predetermined value.

7. A method for transmitting a data packet from a transmitting apparatus including a transmit buffer to a receiving apparatus including a receive buffer, the method comprising:

transmitting from the receiving apparatus to the transmitting apparatus, when a data packet stored in the receive buffer is read, size specifying information which does not correspond with a size of the data packet read, the data packet being read out in an order that the receiving apparatus receives the data packet;

storing in a credit counter in the transmitting apparatus, a credit count being a value corresponding with a total size of all data packets currently stored in a capacity of the receive buffer, and storing when a data packet is transmitted to the receiving apparatus, a credit element having a value that corresponds with the size of the data packet;

incrementing the credit count by a value corresponding to the size of a data packet transmitted when the transmitting apparatus transmits the data packet;

decrementing the credit count by a value corresponding to an oldest credit element in the credit storage and deleting the oldest credit element when the receiving apparatus transmits the size specifying information to the transmitting apparatus; and controlling permission and suspension of transmission of a data packet to be transmitted from the transmitting apparatus based on the value of the credit count stored.

8. A non-transitory computer readable storage medium containing instructions to transmit a data packet from a transmitting apparatus including a transmit buffer to a receiving apparatus including a receive buffer, the instructions, when executed by a computer, causing the computer to perform a process comprising:

transmitting from the receiving apparatus being a computer to the transmitting apparatus being a computer, when a data packet stored in the receive buffer is read, size specifying information which does not correspond with a size of the data packet read, the data packet being read out in an order that the receiving apparatus receives the data packet;

storing in a credit counter in the transmitting apparatus, a credit count being a value corresponding with a total size of all data packets currently stored in a capacity of the receive buffer, and storing when a data packet is transmitted to the receiving apparatus, a credit element having a value that corresponds to the size of the data packet;

incrementing the credit count by a value corresponding to the size of a data packet transmitted when the transmitting apparatus transmits the data packet;

decrementing the credit count by a value corresponding to an oldest data credit element stored in the credit storage and deleting the oldest credit element when the receiving apparatus transmits the size specifying information to the transmitting apparatus; and controlling permission and suspension of transmission of a data packet to be transmitted from the transmitting apparatus based on a value of the credit count stored.

9. A transmitting apparatus, transmitting a data packet to a receiving apparatus including a receive buffer which stores data packets in an order of transmission of the data packets, the transmitting apparatus comprising:

a credit storage that stores a credit count being a value corresponding to a total size of all data packets stored in the receive buffer, and stores when a data packet is transmitted to the receiving apparatus, a credit element having a value that corresponds to the size of the data packet;

a credit adding unit that increments the credit count by a value corresponding to the size of a data packet transmitted when the transmitting apparatus transmits the data packet;

a credit subtracting unit that decrements the credit count by a value corresponding to an oldest credit element in the credit storage and deletes the oldest credit element when the receiving apparatus transmits size specifying information to the transmitting apparatus, wherein the size specifying information does not correspond with the size of data packets read out of the receive buffer; and a transmission controlling unit that controls permission and suspension of transmission of a data packet to be transmitted from the transmitting apparatus based on the value of the credit count stored in the credit storage.

10. A method to transmit data packets from a transmitting apparatus including a transmit buffer to a receiving apparatus including a receive buffer, the method comprising:

receiving by the receiving apparatus a data packet transmitted from the transmitting apparatus, the data packet including identification information being added thereto by the transmitting apparatus uniquely identifying the data packet;

transmitting from the receiving apparatus to the transmitting apparatus, when a data packet stored in the receive buffer is read, the identification information;

storing in the transmitting apparatus, a credit count being a value corresponding to a total size of all data packets currently stored in a capacity of the receive buffer, and storing, when a data packet is transmitted to the receiving apparatus, the identification information in association with a credit element having a value corresponding to the size of the data packet;

incrementing the credit count by a value corresponding to the size of a data packet and storing in the credit storage a credit element of the data packet when the transmitting apparatus transmits the data packet;

decrementing, when the identification information is received from the receiving apparatus, the credit count by the value of the credit element that is associated with the identification information received; and controlling permission and suspension of transmission of a data packet to be transmitted from the transmitting apparatus based on the value of the credit count, adding the identification information to the data packet when permitting transmission of the data packet, and transmitting the data packet to the receiving apparatus.

11. A non-transitory computer readable storage medium containing instructions to transmit data packets from a transmitting apparatus including a transmit buffer to a receiving apparatus including a receive buffer, the instructions, when executed by a computer, causing the computer to perform a process comprising:

receiving, by the receiving apparatus, a data packet transmitted from a transmitting apparatus, the data packet including identification information being added thereto by the transmitting apparatus uniquely identifying the data packet;

transmitting from the receiving apparatus to the transmitting apparatus, when a data packet stored in the receive buffer is read, the identification information;

storing in the transmitting apparatus, a credit count being a value corresponding with a total size of all data packets currently stored in a capacity of the receive buffer, and storing, when a data packet is transmitted to the receiving apparatus, the identification information in association with a credit element having a value corresponding to the size of the data packet;

incrementing the credit count by a value corresponding to the size of a data packet and storing in the credit storage a credit element of the data packet when the transmitting apparatus transmits the data packet;

decrementing, when the identification information is received from the receiving apparatus, the credit count by the value of the credit element that is associated with the identification information received; and controlling permission and suspension of transmission of a data packet to be transmitted from the transmitting apparatus based on the value of the credit count credit, adding the identification information to the data packet when permitting transmission of the data packet, and transmitting the data packet to the receiving apparatus.

12. A transmitting apparatus, transmitting a data packet to a receiving apparatus including a receive buffer, the transmitting apparatus comprising:

a transmitting unit that transmits a data packet to the receiving apparatus, the data packet including identification information added thereto by the transmitting apparatus which uniquely identifies the data packet;

a credit storage that stores a credit count being a value corresponding to a total size of all data packets stored in the receive buffer, and stores, when a data packet is transmitted to the receiving apparatus, the identification information in association with a credit element having a value corresponding to the size of the data packet;

a credit adding unit that increments the credit count by a value corresponding to the size of a data packet and stores in the credit storage a credit element of the data packet when the transmitting apparatus transmits the data packet;

a credit subtracting unit that decrements, when the identification information is received from the receiving apparatus, the credit count by the value of the credit element that is associated with the identification information received; and a transmission controlling unit that controls permission and suspension of transmission of a data packet to be transmitted from the transmitting apparatus based on the value of the credit count, adds the identification information to the data packet when permitting transmission of the data packet, and transmits the data packet to the receiving apparatus.

* * * * *

UNITED STATES PATENT AND TRADEMARK OFFICE
CERTIFICATE OF CORRECTION

PATENT NO.       : 8,631,152 B2
APPLICATION NO.  : 12/385885
DATED            : January 14, 2014
INVENTOR(S)      : Osano et al.

Page 1 of 1

It is certified that error appears in the above-identified patent and that said Letters Patent is hereby corrected as shown below:

In the Claims

In Column 28, Line 11, In Claim 11, delete "credit count credit," and insert -- credit count, --, therefor.

Signed and Sealed this
Twenty-ninth Day of April, 2014

Michelle K. Lee
*Deputy Director of the United States Patent and Trademark Office*